US008307389B2

(12) United States Patent  (10) Patent No.: US 8,307,389 B2
Sakai et al.  (45) Date of Patent: Nov. 6, 2012

(54) INFORMATION PROCESSING APPARATUS, INFORMATION PROCESSING METHOD, COMPUTER PROGRAM, AND INFORMATION SHARING SYSTEM

(75) Inventors: Yusuke Sakai, Kanagawa (JP); Kazuto Mugura, Tokyo (JP); Tomohiro Tsunoda, Tokyo (JP); Tomohiro Ishii, Tokyo (JP); Yuki Shoji, Tokyo (JP)

(73) Assignee: Sony Corporation, Tokyo (JP)

( * ) Notice: Subject to any disclaimer, the term of this patent is extended or adjusted under 35 U.S.C. 154(b) by 835 days.

(21) Appl. No.: 12/270,177

(22) Filed: Nov. 13, 2008

(65) Prior Publication Data

US 2009/0133081 A1  May 21, 2009

(30) Foreign Application Priority Data

Nov. 16, 2007  (JP) ................................ P2007-298617

(51) Int. Cl.
*H04H 60/33* (2008.01)
*H04N 7/16* (2011.01)
*H04N 7/173* (2011.01)
*G06F 3/00* (2006.01)
*G06F 13/00* (2006.01)
*H04N 5/445* (2011.01)

(52) U.S. Cl. ............ 725/25; 725/9; 725/10; 725/11; 725/12; 725/13; 725/37; 725/109; 725/110; 725/115

(58) Field of Classification Search ............ 725/9–14, 725/37, 109–110

See application file for complete search history.

(56) References Cited

U.S. PATENT DOCUMENTS

| 7,243,105 | B2 * | 7/2007 | Thint et al. ............ 1/1 |
| 2003/0050976 | A1 * | 3/2003 | Block et al. ............ 709/203 |
| 2011/0107369 | A1 * | 5/2011 | O'Brien et al. ............ 725/38 |

FOREIGN PATENT DOCUMENTS

| JP | 2003 250146 | 9/2003 |
| JP | 2006 39918 | 2/2006 |
| JP | 2006 50370 | 2/2006 |
| JP | 2007 259245 | 10/2007 |

* cited by examiner

*Primary Examiner* — Dominic D Saltarelli

(74) *Attorney, Agent, or Firm* — Frommer Lawrence & Haug LLP; William S. Frommer; Thomas F. Presson

(57) ABSTRACT

An information processing apparatus that can communicate with plural content viewing apparatuses includes a group registering unit that registers users of the content viewing apparatuses in groups, a sharing-level setting unit that sets sharing level information representing an information sharing level among users belonging to an identical group, a viewing-information receiving unit that receives viewing information of the users, a user-viewing-content managing unit that manages a user viewing content database, a discriminating unit that discriminates, when a viewing information request of another user is received, the other users belonging to a group identical with a group to which the user of the content viewing apparatus at the request source belongs, an information extracting unit that extracts viewing information of the discriminated other users from the user viewing content database, and a viewing-information transmitting unit that transmits the viewing information to the content viewing apparatus at the request source.

43 Claims, 32 Drawing Sheets

GROUP X/GROUP DB

| USER ID | USER NAME |
|---------|-----------|
| 001 | USER A |
| 002 | USER B |
| 003 | USER C |
| 004 | USER D |
| 005 | USER E |
| 006 | USER F |
| 007 | USER G |
| ⋮ | ⋮ |

USER A/USER CORRELATION INFORMATION

| USER ID | CLOSENESS LEVEL VALUE |
|---------|----------------------|
| — | — |
| 002 | 3 |
| 003 | 2 |
| 004 | 5 |
| 005 | 1 |
| 006 | 2 |
| 007 | 4 |
| ... | ... |

USER B/USER CORRELATION INFORMATION

| USER ID | CLOSENESS LEVEL VALUE |
|---------|----------------------|
| 001 | 3 |
| — | — |
| 003 | 3 |
| 004 | 1 |
| 005 | 4 |
| 006 | 3 |
| 007 | 2 |
| ... | ... |

USER C/USER CORRELATION INFORMATION

| USER ID | CLOSENESS LEVEL VALUE |
|---------|----------------------|
| 001 | 2 |
| 002 | 3 |
| — | — |
| 004 | 4 |
| 005 | 5 |
| 006 | 3 |
| 007 | 3 |
| ... | ... |

FIG. 10

USER A/INFORMATION DISCLOSURE LEVEL INFORMATION

| USER ID | DISCLOSURE LEVEL VALUE |
|---------|------------------------|
| 001     | 3                      |

USER A/INFORMATION ACQUISITION LEVEL INFORMATION

| USER ID | ACQUISITION LEVEL VALUE |
|---------|-------------------------|
| 001     | 3                       |

~216

USER B/INFORMATION DISCLOSURE LEVEL INFORMATION

| USER ID | DISCLOSURE LEVEL VALUE |
|---------|------------------------|
| 002     | 3                      |

USER B/INFORMATION ACQUISITION LEVEL INFORMATION

| USER ID | ACQUISITION LEVEL VALUE |
|---------|-------------------------|
| 002     | 4                       |

USER C/INFORMATION DISCLOSURE LEVEL INFORMATION

| USER ID | DISCLOSURE LEVEL VALUE |
|---------|------------------------|
| 003     | 1                      |

USER C/INFORMATION ACQUISITION LEVEL INFORMATION

| USER ID | ACQUISITION LEVEL VALUE |
|---------|-------------------------|
| 003     | 1                       |

FIG. 11

USER A/VIEWING INFORMATION

EXAMPLE 1: DURING TELEVISION BROADCAST CONTENT VIEWING

| ITEM | VALUE |
|---|---|
| MEDIUM | BS DIGITAL |
| CHANNEL | 123ch |
| CONTENT ID | 000456 |
| VIEWING START TIME | 01/01 12:00 |
| VIEWING DURATION | 00:25 |
| VIEWING PLAN 001 | 01/03 16:15 CS/081ch |
| VIEWING PLAN 002 | 01/05 22:16 BS/030ch |
| ⋮ | ⋮ |

EXAMPLE 2: DURING VOD CONTENT VIEWING

| ITEM | VALUE |
|---|---|
| MEDIUM | VOD |
| CHANNEL | 001ch |
| CONTENT ID | 456789 |
| VIEWING START TIME | 05/12 22:00 |
| VIEWING DURATION | 01:40 |
| VIEWING PLAN 001 | 05/23 19:00 112233 |
| VIEWING PLAN 002 | 05/30 22:00 445566 |
| ⋮ | ⋮ |

USER A/USER VIEWING DB

| VIEWING ID | VIEWING DATE AND TIME | CONTENT IDENTIFICATION INFORMATION | VIEWING ATTRIBUTE | |
|---|---|---|---|---|
| ... | ... | ... | ... | |
| 773 | 01/01 12:00 | BS/123ch | HISTORY IN THE PAST | HISTORY IN THE PAST |
| 774 | 01/15 18:00 | CS/081ch | HISTORY IN THE PAST | |
| 775 | 02/01 22:00 | BS/030ch | PRESENT STATE | PRESENT STATE |
| 776 | 02/08 06:00 | 445566 | VIEWING PLAN | FUTURE PLAN |
| ... | ... | ... | ... | |

FIG. 13

CONTENT INFORMATION DB ~224

| DATE AND TIME | BROADCAST CHANNEL | DELIVERY CHANNEL | |
|---|---|---|---|
| ... | ... | ... | |
| 10:00 | CONTENT ID 01 | CONTENT ID 11 | HISTORY IN THE PAST |
| 11:00 | CONTENT ID 02 | CONTENT ID 12 | |
| 12:00 | CONTENT ID 03 | CONTENT ID 13 | PRESENT STATE |
| 13:00 | CONTENT ID 04 | CONTENT ID 14 | FUTURE PLAN |
| 14:00 | CONTENT ID 05 | CONTENT ID 15 | |
| ... | ... | ... | |

GROUP X/USER VIEWING CONTENT DB

| DATE AND TIME | BROADCAST CHANNEL | VIEWING USER INFORMATION | |
|---|---|---|---|
| ... | ... | ... | |
| 10:00 | CONTENT ID 01 | USER A, USER C | HISTORY IN THE PAST |
| 11:00 | CONTENT ID 02 | | |
| 12:00 | CONTENT ID 03 | USER A, USER B, USER C ... | PRESENT STATE |
| 13:00 | CONTENT ID 04 | USER D (80%) | FUTURE PLAN |
| ... | ... | ... | |

FIG. 15

USER VIEWING CONTENT DB FILTERED FOR USER A  ~228

| DATE AND TIME | BROADCAST CHANNEL | VIEWING USER INFORMATION | |
|---|---|---|---|
| ... | ... | ... | |
| 10:00 | CONTENT ID 01 | USER A, ~~USER C~~ | HISTORY IN THE PAST |
| 11:00 | CONTENT ID 02 | | |
| 12:00 | CONTENT ID 03 | USER A, USER B, ~~USER C~~ ... | PRESENT STATE |
| 13:00 | CONTENT ID 04 | USER D (80%) | FUTURE PLAN |
| ... | ... | ... | |

FIG. 16

USER A/USER VIEWING DB ~222

| VIEWING ID | VIEWING DATE AND TIME | CONTENT IDENTIFICATION INFORMATION | VIEWING ATTRIBUTE | |
|---|---|---|---|---|
| ... | ... | ... | ... | |
| 773 | 01/01 12:00 | BS/123ch | HISTORY IN THE PAST | HISTORY IN THE PAST |
| 774 | 01/15 18:00 | CS/081ch | HISTORY IN THE PAST | |
| 775 | 02/01 22:00 | BS/030ch | PRESENT STATE | PRESENT STATE |
| 776 | 02/08 06:00 | 445566 | VIEWING PLAN | FUTURE PLAN |
| 777 | 03/11 09:00 | 112233 | VIEWING PREDICTION (80%) | FUTURE PREDICTION |
| ... | ... | ... | ... | |

FIG. 17

GROUP X/USER VIEWING CONTENT DB (INCLUDING FUTURE PREDICTION) ~228

| DATE AND TIME | BROADCAST CHANNEL | VIEWING USER INFORMATION | |
|---|---|---|---|
| ... | ... | | |
| 10:00 | CONTENT ID 01 | USER A, USER C | HISTORY IN THE PAST |
| 11:00 | CONTENT ID 02 | | |
| 12:00 | CONTENT ID 03 | USER A, USER B, USER C | PRESENT STATE |
| 13:00 | CONTENT ID 04 | USER D (80%) | FUTURE PLAN |
| 14:00 | CONTENT ID 05 | USER A (100%), USER B (40%) | FUTURE PREDICTION |
| ... | ... | | |

FIG. 18

228 USER VIEWING CONTENT DB FILTERED FOR USER A (INCLUDING FUTURE PREDICTION)

| DATE AND TIME | BROADCAST CHANNEL | VIEWING USER INFORMATION | |
|---|---|---|---|
| ... | ... | | |
| 10:00 | CONTENT ID 01 | USER A, ~~USER C~~ | HISTORY IN THE PAST |
| 11:00 | CONTENT ID 02 | | |
| 12:00 | CONTENT ID 03 | USER A, USER B, ~~USER C~~ | PRESENT STATE |
| 13:00 | CONTENT ID 04 | USER D (80%) | FUTURE PLAN |
| 14:00 | CONTENT ID 05 | USER A (100%), USER B (40%) | FUTURE PREDICTION |
| ... | ... | | |

FIG. 27
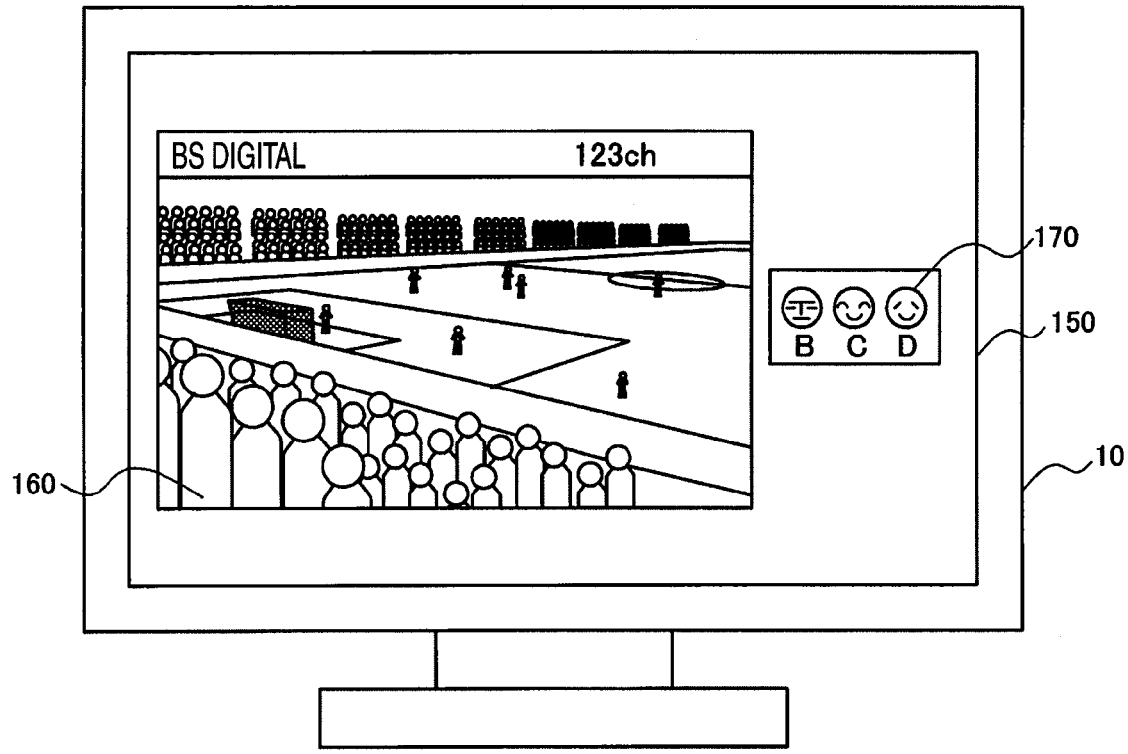
LIMIT OBJECT USER RANGE (EXAMPLE. LEVEL 5)
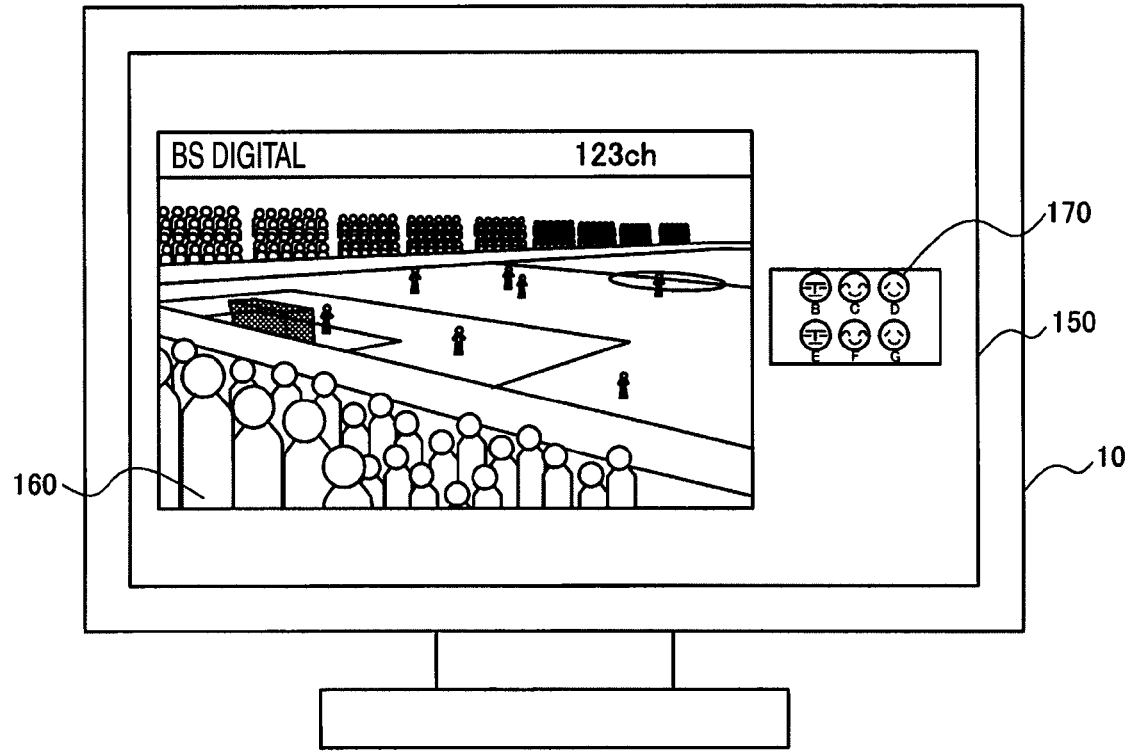
EXPAND OBJECT USER RANGE (EXAMPLE. LEVEL 2)

FIG. 28
LIMIT OBJECT USER RANGE (EXAMPLE. LEVEL 5)
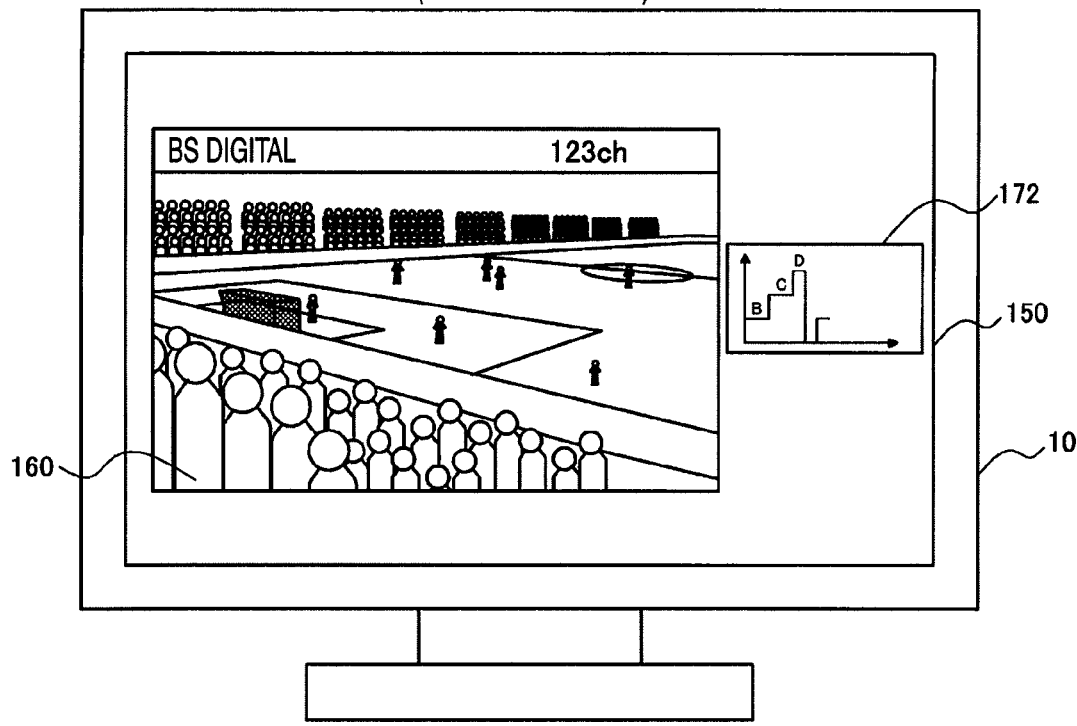
EXPAND OBJECT USER RANGE (EXAMPLE. LEVEL 2)
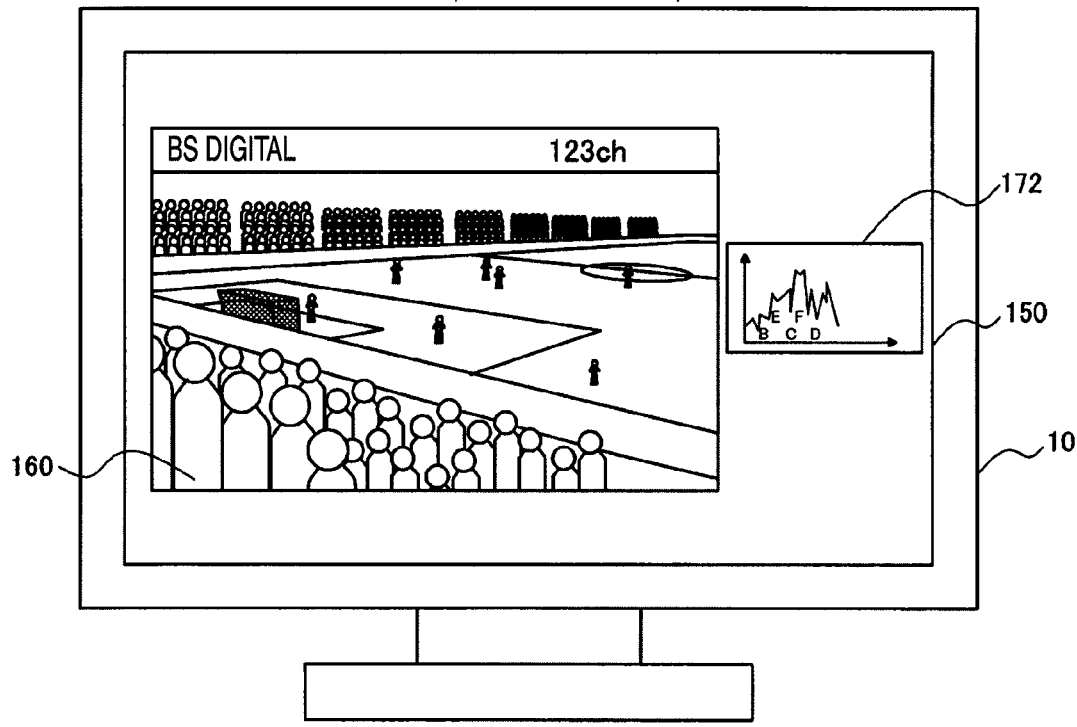

FIG. 29
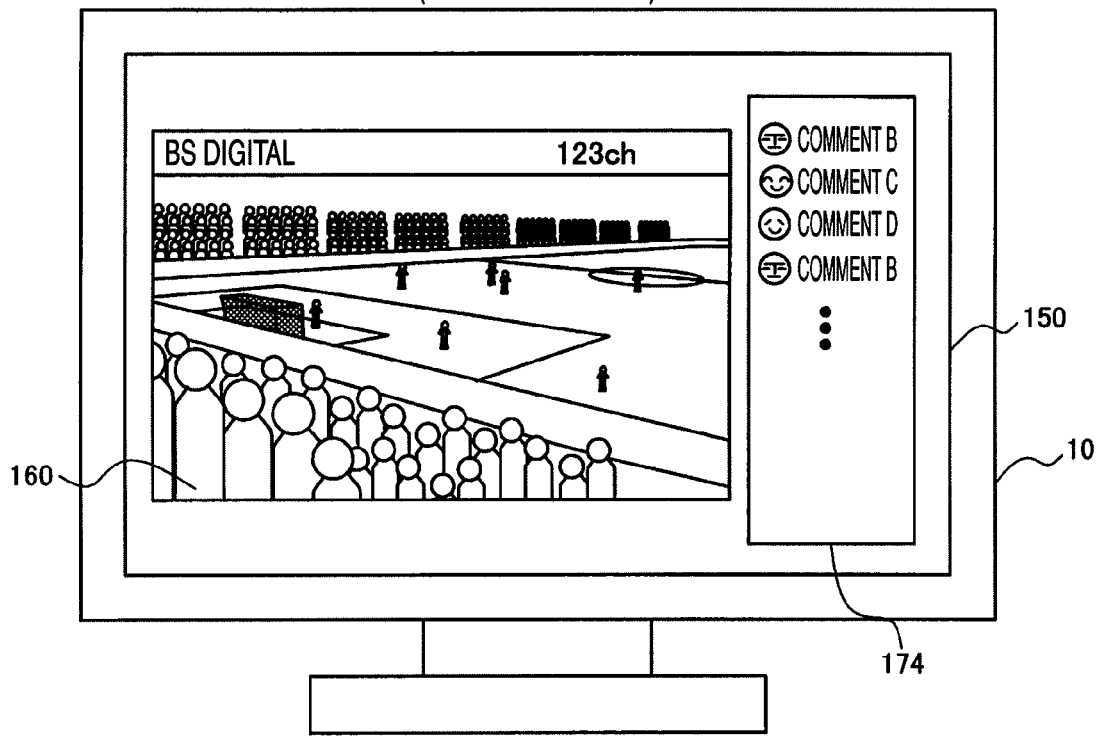
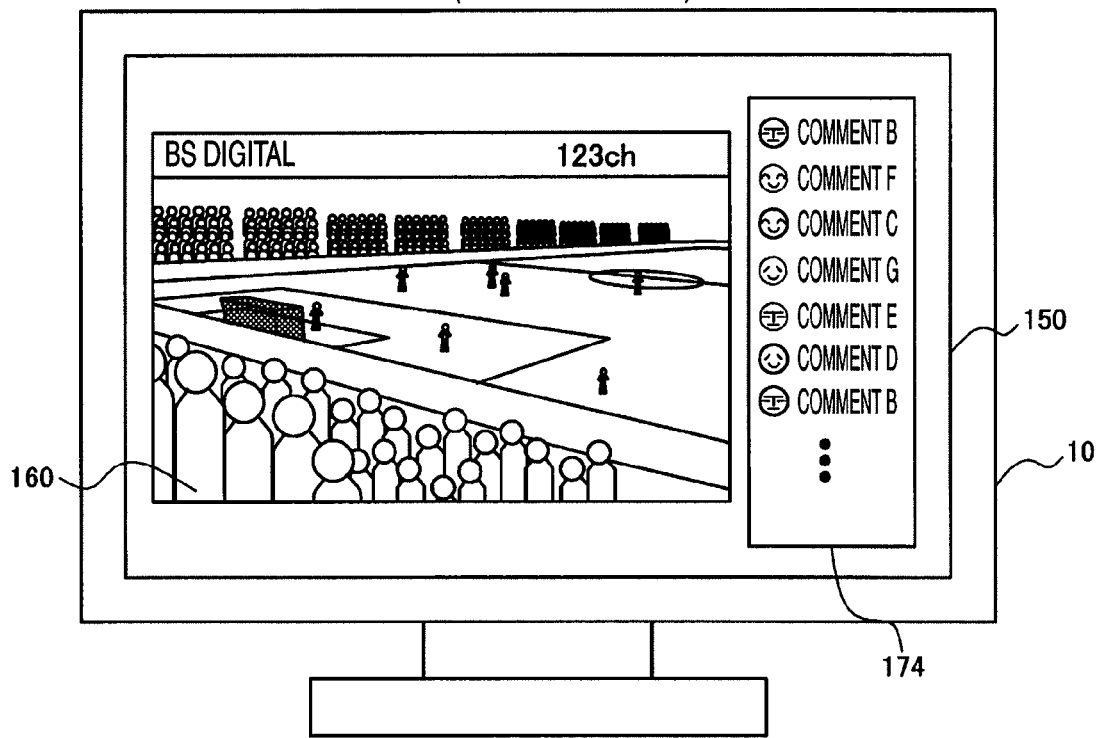

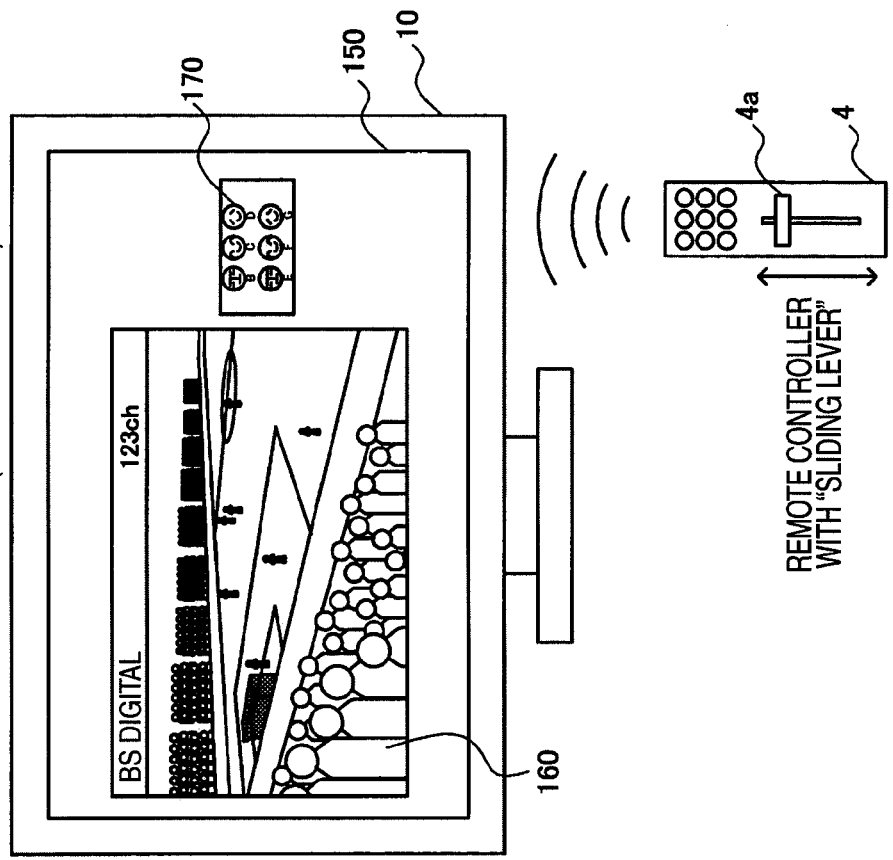
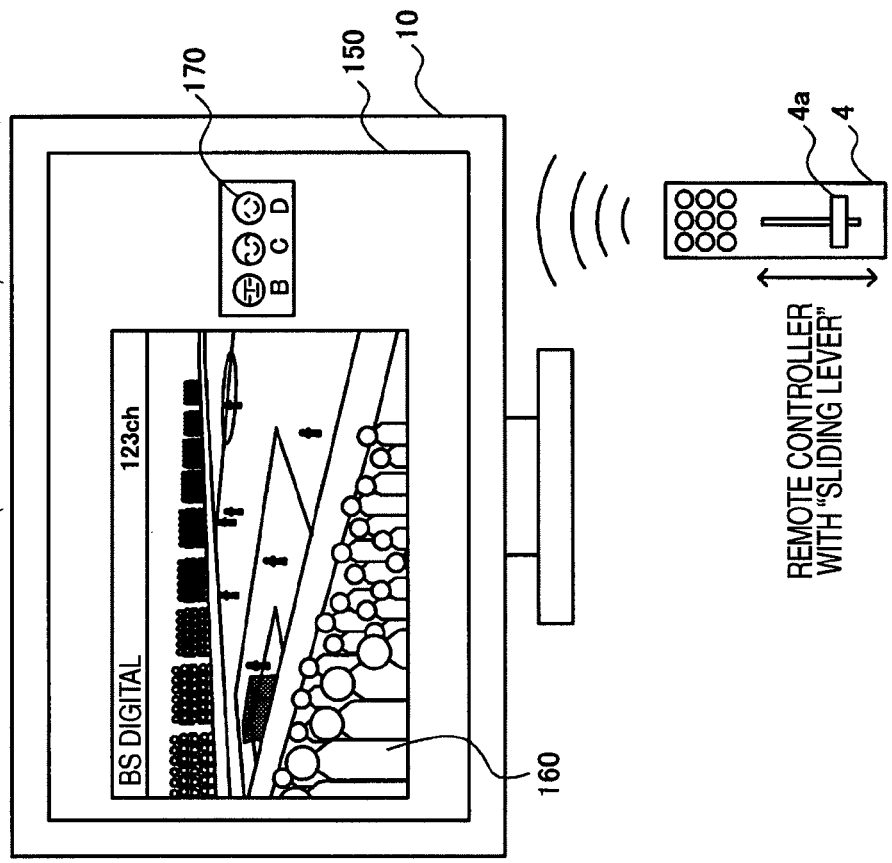

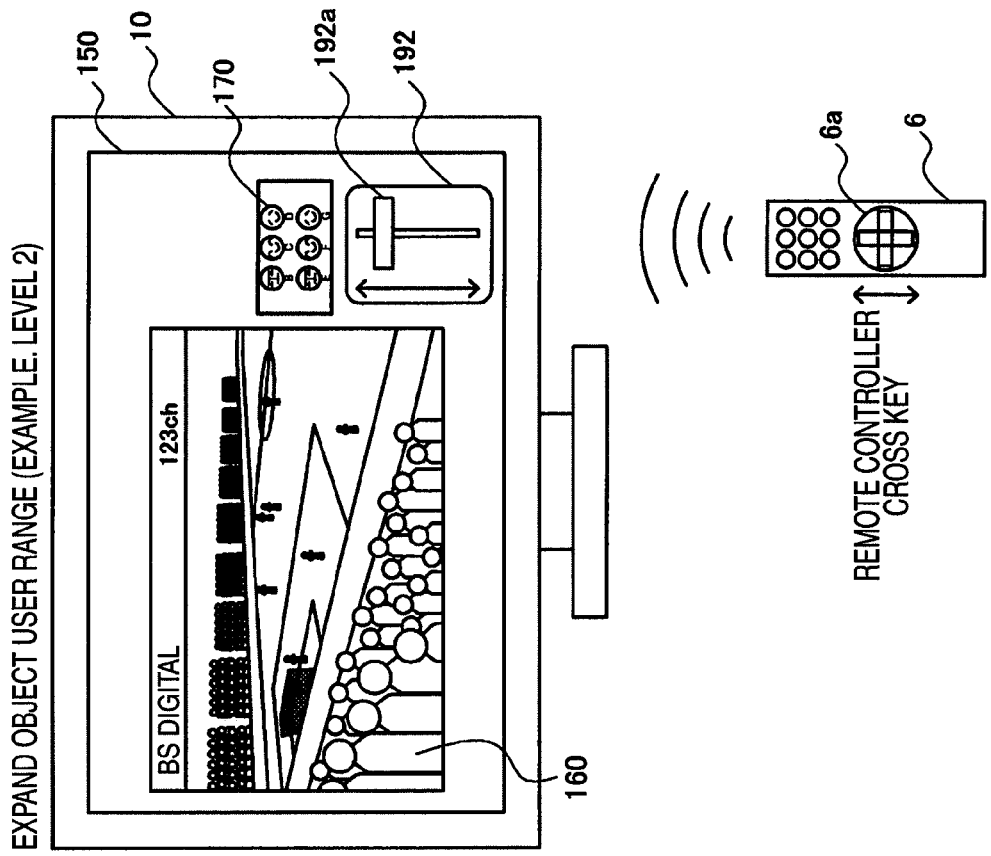
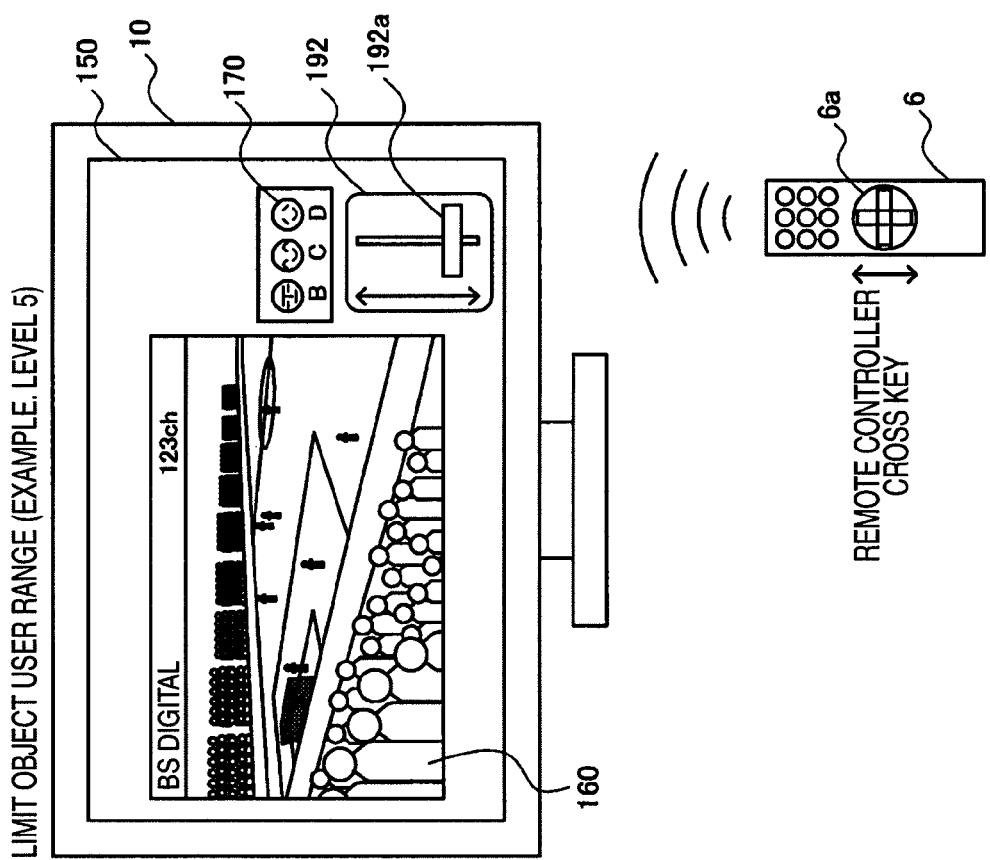

INFORMATION PROCESSING APPARATUS, INFORMATION PROCESSING METHOD, COMPUTER PROGRAM, AND INFORMATION SHARING SYSTEM

CROSS-REFERENCES TO RELATED APPLICATIONS

The present invention contains subject matter related to Japanese Patent Application JP 2007-298617 filed in the Japanese Patent Office on Nov. 16, 2007, the entire contents of which being incorporated herein by reference.

BACKGROUND OF THE INVENTION

1. Field of the Invention

The present invention relates to an information processing apparatus, an information processing method, a computer program, and an information sharing system.

2. Description of the Related Art

In recent years, computerization of various home electronics has been advanced. For example, a television receiver has not only a function of receiving video and sound contents of programs from broadcasting stations and displaying the contents but also a function of acquiring various kinds of information such as program guides and displaying the information. A television receiver including a network communication function can exchange various kinds of information with other receivers as well.

For example, JP-A-2006-50370 discloses a technique for displaying, when a user views a program content of a television broadcast in a television receiver, information concerning other registered users (e.g., thumbnail images of the other users and names, channels, and videos of contents viewed by the other users) in parallel to the program content. This allows the user to acquire, during the viewing of the program content, the information concerning the contents and the channels viewed by the other users. Therefore, the user can obtain a chance for viewing unknown contents and a chance for viewing contents together with the other users.

SUMMARY OF THE INVENTION

However, the viewing information of the user described above (information indicating which content the user is viewing) is information related to privacy of an individual. Therefore, the user who discloses the viewing information may not wish to disclose the viewing information to complete strangers, estranged acquaintances, and the like. When the user acquires viewing information of the other users, the user may wish to acquire viewing information of people having close relations with the user such as family members and close friends or may wish to obtain viewing information of as many people as possible including estranged acquaintances.

The technique disclosed in JP-A-2006-50370 does not have a function of performing privacy management for viewing information shared among users and arbitrarily adjusting a range of users from whom the viewing information is acquired. Therefore, it is difficult for a user who worries about privacy to user the technique. When the user acquire viewing information of the other users as a chance for viewing a content, it is difficult for the user to select viewing information of the other users according to preference of the user.

Therefore, it is desirable to provide an information processing apparatus, an information processing method, a computer program, and an information sharing system that can flexibly perform privacy management and adjustment of an information acquisition range corresponding to preference of a user when viewing information of a content is shared among users.

According to an embodiment of the present invention, there is provided an information processing apparatus that can communicate with plural content viewing apparatuses via a network, the information processing apparatus including: a group registering unit that registers users of the content viewing apparatuses in groups; a sharing-level setting unit that sets, on the basis of level setting instructions received from the content viewing apparatuses, sharing level information representing an information sharing level among users belonging to an identical group; a viewing-information receiving unit that receives viewing information of the users in the content viewing apparatuses from the content viewing apparatuses; a user-viewing-content managing unit that manages, on the basis of the viewing information received from the content viewing apparatuses, a user viewing content database in which plural contents that can be provided to the content viewing apparatuses and users who view the contents are associated; a discriminating unit that discriminates, when a viewing information request of another user is received from the content viewing apparatus, on the basis of the sharing level information, the other users belonging to a group identical with a group to which the user of the content viewing apparatus at the request source belongs; an information extracting unit that extracts viewing information of the discriminated other users from the user viewing content database; and a viewing-information transmitting unit that transmits the viewing information of the discriminated other users to the content viewing apparatus at the request source.

The sharing level information may include information disclosure level information representing a range of other users to whom a certain user permits disclosure of viewing information of the user and information acquisition level information representing a range of other users from whom a certain user acquires viewing information. The sharing-level setting unit may set, on the basis of the level setting instructions received from the content viewing apparatuses, the information disclosure level information and the information acquisition level information for the users of the content viewing apparatuses. The discriminating unit may discriminate, out of the other users belonging to the group identical with the group to which the user of the content viewing apparatus at the request source belongs, other users in a user range represented by the information acquisition level information set for the user, the user being included in a user range represented by the information disclosure level information set for the other users.

During viewing of contents in the content viewing apparatuses, the sharing-level setting unit may dynamically set and change setting levels of the information disclosure level information and the information acquisition level information according to a change in the level setting instructions received from the content viewing apparatuses. The discriminating unit may dynamically change, according to the setting and changing for the information disclosure level information and the information acquisition level information, other users discriminated out of the other users belonging to the group identical with the group to which the user of the content viewing apparatus at the request source belongs.

The sharing-level setting unit may set level values of both the information disclosure level information and the information acquisition level information on the basis of one setting instruction value included in the level setting instruction. The sharing-level setting unit may have plural setting modes for setting the level value of the information disclosure level information and/or the level value of the information acquisition level information to values different from each other on the basis of the one setting instruction value.

The sharing level information may include user correlation information representing a closeness level among users belonging to the identical group. The discriminating unit may discriminate, on the basis of the user correlation information, the information disclosure level information and the information acquisition level information, the other users belonging to the group identical with the group to which the user of the content viewing apparatus at the request source belongs.

During viewing of contents in the content viewing apparatuses, the sharing-level setting unit may dynamically set and change the setting level of the sharing level information according to a change in the level setting instructions received from the content viewing apparatus. The discriminating unit may dynamically change, according to the setting and changing for the setting level of the sharing level information, other users discriminated out of the other users belonging to the group identical with the group to which the user of the content viewing apparatus at the request source belongs.

The viewing information may include at least one of information concerning contents viewed in the content viewing apparatuses, information representing enthusiasm of a user for content viewing, and viewing state information representing a content viewing state of a user.

According to another embodiment of the present invention, there is provided an information processing method in an information processing apparatus that can communicate with plural content viewing apparatuses via a network, the information processing method including the steps of: registering users of the content viewing apparatuses in groups; setting, on the basis of level setting instructions received from the content viewing apparatuses, sharing level information representing an information sharing level among users belonging to an identical group; receiving viewing information of the users in the content viewing apparatuses from the content viewing apparatuses; managing, on the basis of the viewing information received from the content viewing apparatuses, a user viewing content database in which plural contents that can be provided to the content viewing apparatuses and users who view the contents are associated; discriminating, when a viewing information request of another user is received from the content viewing apparatus, on the basis of the sharing level information, the other users belonging to a group identical with a group to which the user of the content viewing apparatus at the request source belongs; extracting viewing information of the discriminated other users from the user viewing content database; and transmitting the viewing information of the discriminated other users to the content viewing apparatus at the request source.

According to still another embodiment of the present invention, there is provided a computer program for causing an information processing apparatus that can communicate with plural content viewing apparatuses via a network to execute the steps of: registering users of the content viewing apparatuses in groups; setting, on the basis of level setting instructions received from the content viewing apparatuses, sharing level information representing an information sharing level among users belonging to an identical group; receiving viewing information of the users in the content viewing apparatuses from the content viewing apparatuses; managing, on the basis of the viewing information received from the content viewing apparatuses, a user viewing content database in which plural contents that can be provided to the content viewing apparatuses and users who view the contents are associated; discriminating, when a viewing information request of another user is received from the content viewing apparatus, on the basis of the sharing level information, the other users belonging to a group identical with a group to which the user of the content viewing apparatus at the request source belongs; extracting viewing information of the discriminated other users from the user viewing content database; and transmitting the viewing information of the discriminated other users to the content viewing apparatus at the request source.

According to still another embodiment of the present invention, there is provided an information sharing system including plural content viewing apparatuses for viewing contents provided from a content providing apparatus and an information processing apparatus that can communicate with the content viewing apparatuses via a network. The information processing apparatus includes: a group registering unit that registers users of the content viewing apparatuses in groups; a sharing-level setting unit that sets, on the basis of level setting instructions received from the content viewing apparatuses, sharing level information representing an information sharing level among users belonging to an identical group; a viewing-information receiving unit that receives viewing information of the users in the content viewing apparatuses from the content viewing apparatuses; a user-viewing-content managing unit that manages, on the basis of the viewing information received from the content viewing apparatuses, a user viewing content database in which plural contents that can be provided to the content viewing apparatuses and users who view the contents are associated; a discriminating unit that discriminates, when a viewing information request of another user is received from the content viewing apparatus, on the basis of the sharing level information, the other users belonging to a group identical with a group to which the user of the content viewing apparatus at the request source belongs; an information extracting unit that extracts viewing information of the discriminated other users from the user viewing content database; and a viewing-information transmitting unit that transmits the viewing information of the discriminated other users to the content viewing apparatus at the request source. Each of the content viewing apparatuses includes: a level-setting instructing unit that transmits, on the basis of an input of a user of the content viewing apparatus, the level setting instruction for setting the sharing level information to the information processing apparatus; a viewing-information transmitting unit that transmits viewing information of the user in the content viewing apparatus to the information processing apparatus; a viewing-information receiving unit that receives viewing information of the discriminated other users from the information processing apparatus; and a display unit that displays the viewing information of the discriminated other users.

As explained above, according to the embodiments of the present invention, when viewing information of a content is shared among users, it is possible to flexibly perform privacy management and adjustment of an information acquisition range corresponding to preference of a user.

BRIEF DESCRIPTION OF THE DRAWINGS

FIG. 8 is a diagram for explaining group information of a group DB according to the embodiment;

FIG. 9 is a diagram for explaining user correlation information of the group DB according to the embodiment;

FIG. 10 is a diagram for explaining information disclosure level information and information acquisition level information of the group DB according to the embodiment;

FIG. 11 is a diagram for explaining viewing information of a user according to the embodiment;

FIG. 12 is a diagram for explaining a user viewing DB according to the embodiment;

FIG. 13 is a diagram for explaining a content information DB according to the embodiment;

FIG. 14 is a diagram for explaining a user viewing content DB according to the embodiment;

FIG. 15 is a diagram for explaining a filtered user viewing content DB according to the embodiment;

FIG. 16 is a diagram for explaining a user viewing DB according to the modification of the embodiment;

FIG. 17 is a diagram for explaining a user viewing content DB according to the modification of the embodiment;

FIG. 18 is a diagram for explaining a user viewing content DB according to the modification of the embodiment;

FIG. 27 is a diagram for explaining an example of a display screen at the time when level setting and changing is performed in the content viewing apparatus according to the embodiment;

FIG. 28 is a diagram for explaining an example of a display screen at the time when level setting and changing is performed in the content viewing apparatus according to the embodiment;

FIG. 29 is a diagram for explaining an example of a display screen at the time when level setting and changing is performed in the content viewing apparatus according to the embodiment;

FIGS. 30A and 30B are diagrams for explaining a method of dynamically performing level setting and changing in the content viewing apparatus according to the embodiment;

FIGS. 31A and 31B are diagrams for explaining a method of dynamically performing level setting and changing in the content viewing apparatus according to the embodiment.

DESCRIPTION OF THE PREFERRED EMBODIMENTS

Figure 1:
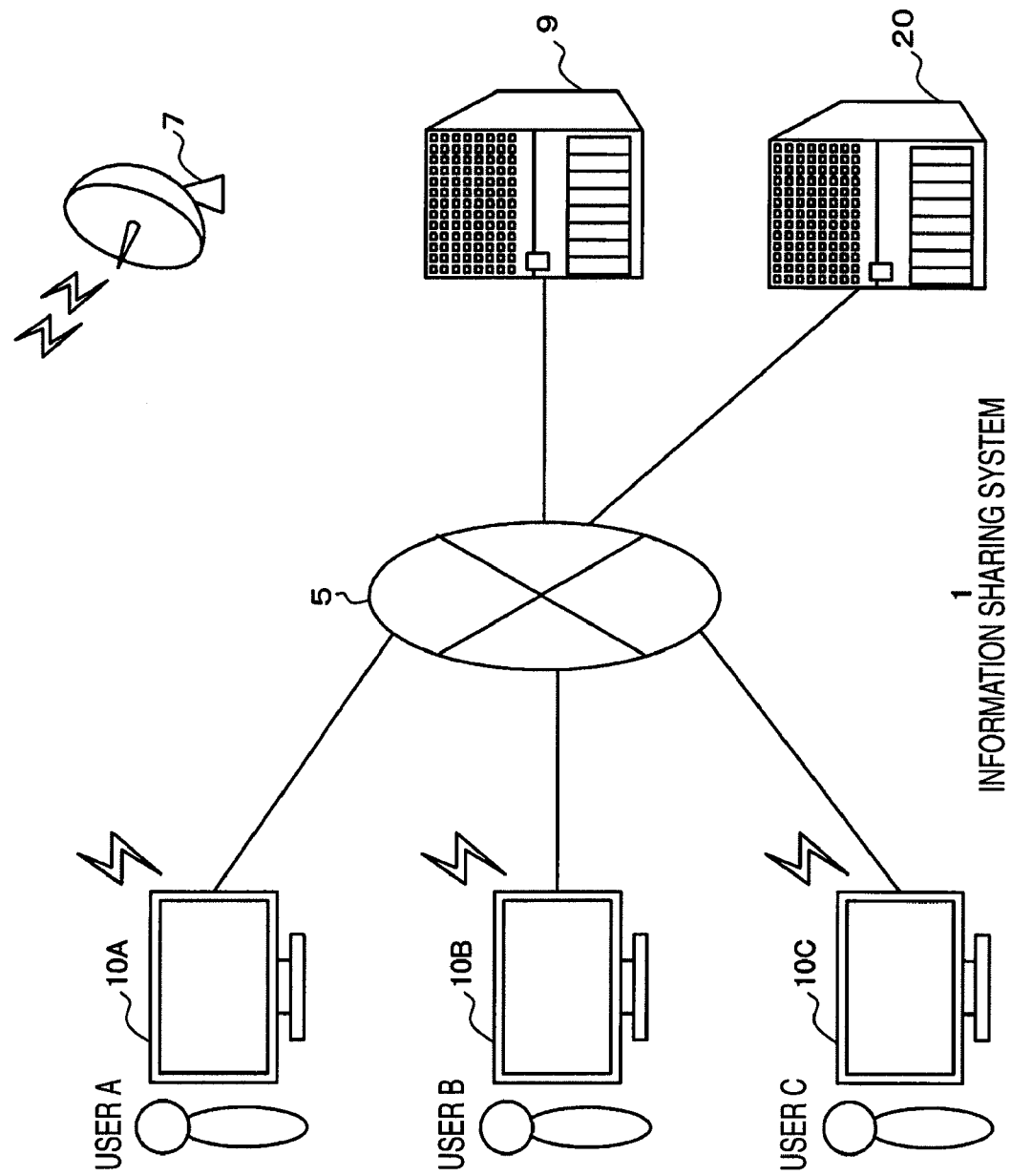
FIG. 1 is a schematic diagram of an information sharing system according to a first embodiment of the present invention.

Embodiments of the present invention are explained in detail below with reference to the accompanying drawings. In this specification and the drawings, components having substantially the same functional configurations are denoted by the same reference numerals and signs and redundant explanation of the components is omitted.

First Embodiment

First, an overview of an information sharing system according to a first embodiment of the present invention is explained with reference to FIG. 1. FIG. 1 is a schematic diagram of the information sharing system according to the first embodiment.

As shown in FIG. 1, an information sharing system 1 according to this embodiment includes plural content viewing apparatuses 10A, 10B, and 10C (which may be generally referred to as "content viewing apparatuses 10" below) used by plural users A, B, C, and the like, respectively, an information management server 20, a broadcasting apparatus 7 of a broadcasting station, a content delivery server 9, and a network 5 that connects these apparatuses to one another.

The network 5 is a network that connects the content viewing apparatuses 10 and the information management server 20 to be capable of communicating with each other. The network 5 may be either a wire network or a wireless network. As the network 5, for example, public line networks such as the Internet, a telephone line network, and a satellite communication network, leased line networks such as various LANs (Local Area Networks) including Ethernet (registered trademark), a WAN (Wide Area Network), an IP-VPN (Internet Protocol-Virtual Private Network), and the like can be used.

The broadcasting apparatus 7 and the content delivery server 9 are configured as examples of a content providing apparatus that provides a content. The broadcasting apparatus 7 is set in the broadcasting station and transmits a program content of a television broadcast to the content viewing apparatus 10 via, for example, a broadcasting radio wave or a leased communication network. Broadcasting programs provided by the broadcasting apparatus 7 may be programs of television broadcasts of arbitrary systems such as a BS broadcast, a CS broadcast, a terrestrial digital broadcast, a terrestrial analog broadcast, and a cable broadcast.

The content delivery server 9 transmits a delivery content such as a movie and music to the content viewing apparatus 10 via the network 5. The content delivery server 9 includes, for example, an IPTV server that provides a program content of IPTV (Internet Protocol Television), a VOD server that provides contents of VOD (Video On Demand), or an electronic music delivery server that delivers music contents.

The content viewing apparatus 10 is an apparatus for reproducing and viewing contents. The content viewing apparatus 10 can be configured by an arbitrary apparatus as long as the apparatus can acquire contents from the outside and reproduce the contents. In an example explained below, the content viewing apparatus 10 is a television receiver (see FIG. 1) that receives and reproduces program contents of a television broadcast. However, a content viewing apparatus of the present invention is not limited to such an example and may be, for example, various computer apparatuses such as a personal computer (PC) and a server apparatus, recording and reproducing apparatuses such as DVD and HDD players and recorders, personal digital electronics such as a game machine for home use, and portable terminals such as a cellular phone, a PDA (Personal Digital Assistant), a portable game machine, and a portable video and sound player. For example, the content viewing apparatus can be applied to a portable terminal such as a cellular phone that can receive and reproduce program contents of a one-segment broadcast.

The content viewing apparatus 10 receives contents from content providing apparatuses such as the broadcasting apparatus 7 and the content delivery server 9 via the network 5 or the like and reproduces the contents. Consequently, the user of the content viewing apparatus 10 can view the reproduced contents. Viewing includes one of watching a reproduced video of a video content and listening to reproduced sound of a sound content or both. When a content is a program content, both an act of watching a program video and an act of listening to program sound correspond to viewing. The content viewing apparatus 10 can acquire contents from the other content viewing apparatuses 10 via the network 5. The content viewing apparatus 10 can also acquire contents via removable recording media (see reference numeral 128 shown in FIG. 3) such as an optical disk (e.g., a DVD or a CD) or a memory card.

A content to be viewed in the content viewing apparatus 10 may be an arbitrary content such as a video content including still images or moving images forming a television program, a movie, a video program, a photograph, a picture, or diagrams, an audio content such as music, public performance, or a radio program, an electronic book (E-book), a game, or software. In the following explanation, a program content of a television broadcast is explained as an example of the content. However, the present invention is not limited to such an example.

The content viewing apparatus 10 stores information concerning viewing (viewing information) of a content by the user in the content viewing apparatus 10 itself. This viewing information is information representing a viewing history of contents, viewing scheduling of contents, a viewing state of the user, and the like in the content viewing apparatus 10. Details of the viewing information are described later. The content viewing apparatus 10 transmits the viewing information of the user of the content viewing apparatus 10 itself to the information management server 20 via the network 5. The content viewing apparatus 10 receives viewing information of the other users in the other content viewing apparatuses 10 from the information management server 20 via the network 5 and displays the received viewing information of the other users in association with contents. For example, the content viewing apparatus 10A of the user A transmits information representing a content A presently viewed by the user A to the information management server 20 as viewing information of the user A. The content viewing apparatus 10A receives information representing the other users B and C who are presently viewing the identical content A from the information management server 20 as viewing information of the users B and C and displays the information in parallel to the content A being reproduced. Consequently, the user A can grasp that the other users B and C are viewing the identical content A.

The information management server 20 is an example of an information processing apparatus of the present invention and has a function of managing viewing information of the users in the content viewing apparatuses 10. The information management server 20 includes a computer apparatus and can communicate with the content viewing apparatuses 10 via the network 5. The information management server 20 receives viewing information of the users from the content viewing apparatuses 10 and forms a database of the viewing information in association with a content program guide. The information management server 20 transmits viewing information of the other users to the content viewing apparatus 10 in response to a request from the content viewing apparatus 10. Consequently, the viewing information of the users can be shared among the content viewing apparatuses 10 of the users. The users can grasp viewing states one another.

The schematic configuration of the information sharing system 1 according to this embodiment is explained above. In the following explanation, configurations of the content viewing apparatus 10 and the information management server 20 configuring the information sharing system 1 are explained.

Figure 2:
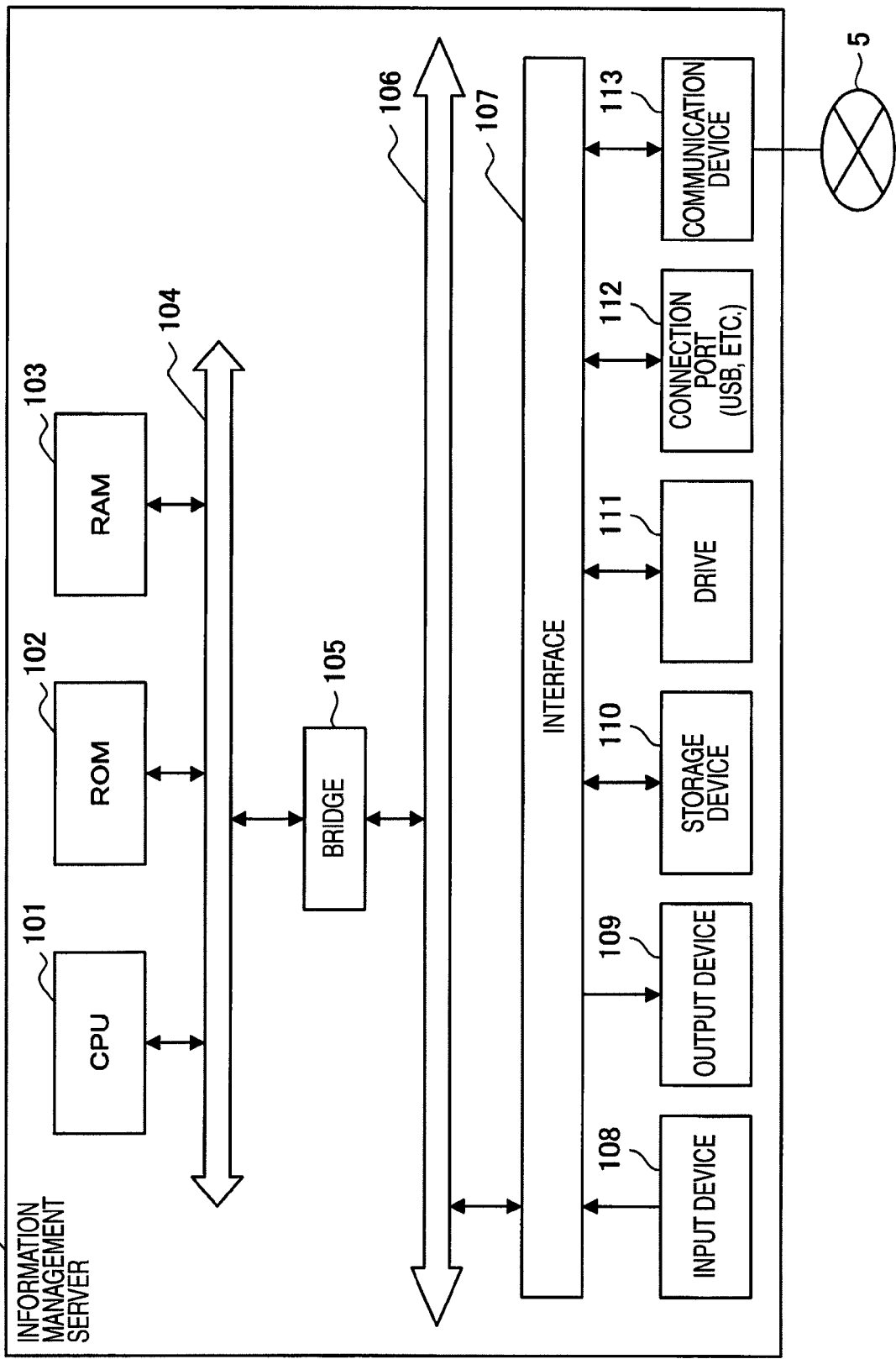
FIG. 2 is a block diagram of a hardware configuration of an information management server according to the embodiment.

First, a hardware configuration of the information management server 20 according to this embodiment is explained with reference to FIG. 2. FIG. 2 is a block diagram of the hardware configuration of the information management server 20 according to this embodiment.

As shown in FIG. 2, the information management server 20 includes, for example, a CPU (Central Processing Unit) 101, a ROM (Read Only Memory) 102, a RAM (Random Access Memory) 103, a host bus 104, a bridge 105, an external bus 106, an interface 107, an input device 108, an output device 109, a storage device (HDD) 110, a drive 111, a connection port 112, and a communication device 113. In this way, the information management server 20 can be configured by using, for example, a general information processing apparatus.

The CPU 101 functions as an arithmetic processing device and a control device, operates according to various programs, and controls respective units in the information management server 20. The CPU 101 executes various kinds of processing according to programs stored in the ROM 102 or programs loaded to the RAM 103 from the storage device 110. The ROM 102 stores programs, arithmetic operation parameters, and the like used by the CPU 101 and functions as a buffer for reducing accesses from the CPU 101 to the storage device 110. The RAM 103 temporarily stores programs used in execution by the CPU 101, parameters that change in the execution as appropriate, and the like. These devices are connected to one another by the host bus 104 including a CPU bus. The host bus 104 is connected to the external bus 106 such as a PCI (Peripheral Component Interconnect/Interface) bus via the bridge 105.

The input device 108 includes operating means such as a mouse, a keyboard, a touch panel, buttons, switches, and a lever and an input control circuit that generates an input signal and outputs the input signal to the CPU 101. The output device 109 includes, for example, a CRT (Cathode Ray Tube) display device, a liquid crystal display (LCD) device, a display device such as a lamp, and a sound output device such as a speaker.

The storage device 110 is configured as an example of a storing unit of the information management server 20 according to this embodiment. The storage device 110 is a device for storing various kinds of information and includes, for example, an HDD (Hard Disk Drive). The storage device 110 drives a hard disk as a storage medium and stores programs and various data executed by the CPU 101. The drive 111 is a reader writer for the storage medium and is incorporated in or externally attached to the information management server 20. The drive 111 writes various data in and reads out various data from a removable storage medium such as a magnetic disk, an optical disk, a magneto-optical disk, or a semiconductor memory loaded in the information management server 20.

The connection port 112 is a port for connecting an external peripheral apparatus and has a connection terminal such as USB or IEEE 1394. The connection port 112 is connected to the CPU 101 and the like via the interface 107, the external bus 106, the bridge 105, the host bus 104, and the like. The communication device 113 is, for example, a communication interface including a communication device and the like for connection to the network 5. The communication device 113 transmits and receives various data via a network 5 between the information management server 20 and an external apparatus such as the content viewing apparatus 10.

When the content viewing apparatus 10 includes an information processing apparatus such as a personal computer, it is possible to adopt a configuration substantially the same as that of the information management server 20. When the content viewing apparatus 10 is a television receiver or the like, since the well-known configuration can be adopted, detailed explanation of a hardware configuration of the content viewing apparatus 10 is omitted.

Figure 3:
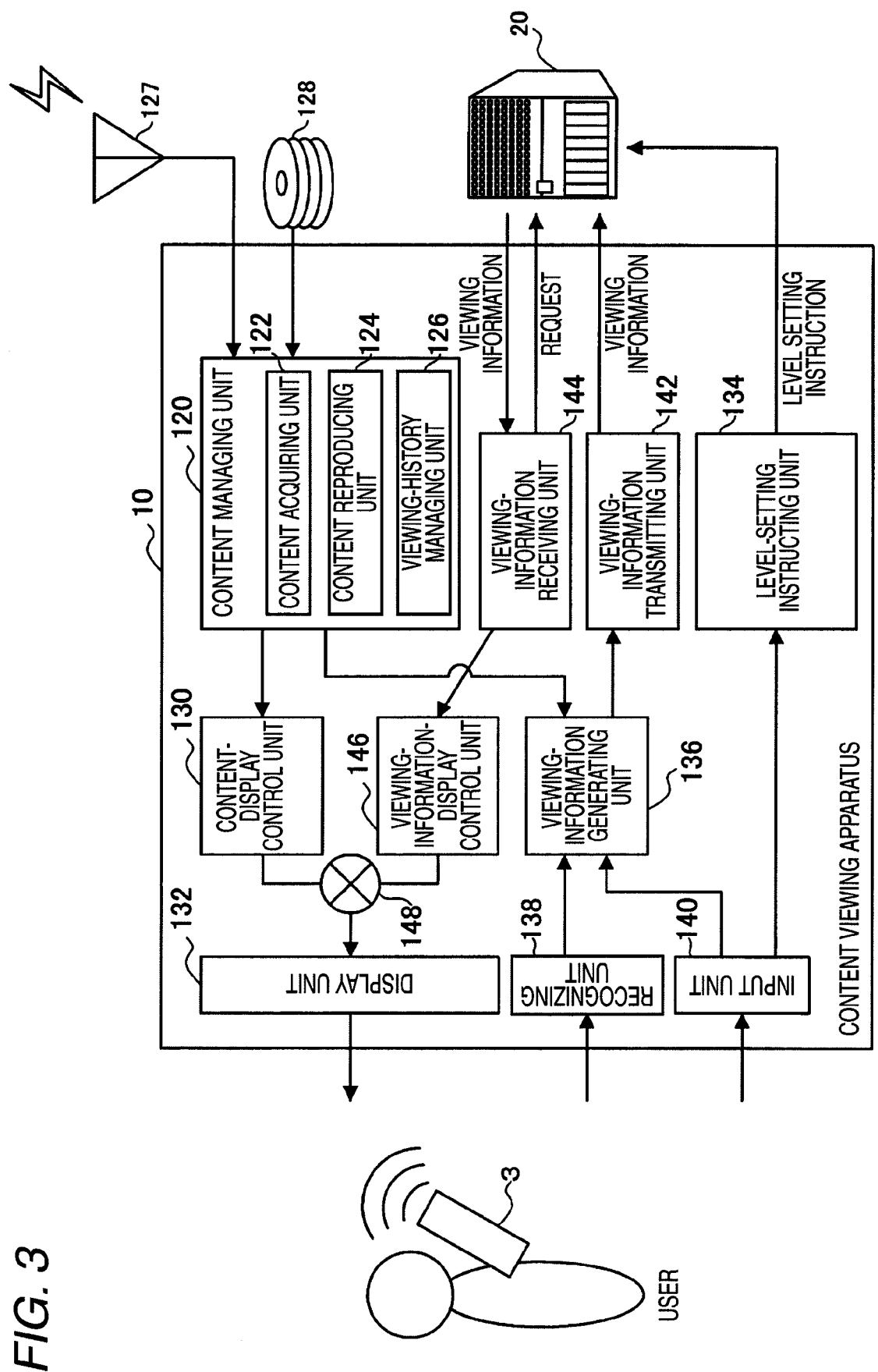
FIG. 3 is a block diagram of a configuration of a content viewing apparatus according to the embodiment.

A configuration of the content viewing apparatus 10 according to this embodiment is explained with reference to FIG. 3. FIG. 3 is a block diagram of the configuration of the content viewing apparatus 10 according to this embodiment.

As shown in FIG. 3, the content viewing apparatus 10 includes a content managing unit 120, a content-display control unit 130, a display unit 132, a level-setting instructing unit 134, a viewing-information generating unit 136, a recognizing unit 138, an input unit 140, a viewing-information transmitting unit 142, a viewing-information receiving unit 144, a viewing-information-display control unit 146, and a superimposing unit 148.

The content managing unit 120 manages viewing of a content in the content viewing apparatus 10. The content managing unit 120 includes, for example, a content acquiring unit 122, a content reproducing unit 124, and a viewing-history managing unit 126.

The content acquiring unit 122 has a function of acquiring a content from an external apparatus. For example, the content acquiring unit 122 receives, via an antenna 127, a program content transmitted from the broadcasting apparatus 7. At this point, the content acquiring unit 122 functions as a tuner for a broadcast program and tunes in and receives a program of a channel designated by the user. The content acquiring unit 122 receives, via the network 5 and the communication device 113 (see FIG. 2), a delivery content transmitted from the content delivery server 9. The content acquiring unit 122 reads out a content stored in the removable recording media 128 loaded to the content viewing apparatus 10 using the drive 111 (not shown). As the removable recording media 128, an arbitrary recording medium like an optical disk such as a next-generation optical disk (Blu-Ray disk, etc.), a DVD-R, a DVD-RW, a DVD-RAM, or a magneto-optical disk or a memory card including various semiconductor memories such as a flash memory can be used.

The content reproducing unit 124 has a function of reproducing a content acquired from the external apparatus. The content reproducing unit 124 functions as, for example, a decoder that decodes content data. The content reproducing unit 124 outputs video data of a content obtained by reproduction processing to the content display unit 122 and outputs sound data to the not-shown speaker.

The viewing-history managing unit 126 manages a viewing history of contents in the content viewing apparatus 10. The viewing history includes information concerning a content viewed in the past, a content presently viewed, and a content scheduled to be viewed in future (a content scheduled for viewing or recording by the user). For example, the viewing-history managing unit 126 can obtain viewing histories in the past and at present by managing a history of reproduction by the content reproducing unit 124. The viewing-history managing unit 126 can obtain a viewing schedule in future as well through management of viewing scheduling or record scheduling by the user. The viewing-history managing unit 126 stores such a viewing history in a viewing history database (not shown). The viewing-history managing unit 126 outputs the viewing history of the contents in the content viewing apparatus 10 to the viewing-information generating unit 136.

The content-display control unit 130 performs image processing necessary for displaying a content reproduced by the content reproducing unit 124 on the display unit 132. For example, the content-display control unit 130 reestablishes a frame of video data of a reproduced content to generate a display screen or adjusts a display position, a size, a display area, and the like of content video data in the screen of the display unit 130.

The display unit 132 includes a display device and displays a video of a content inputted from the content-display control unit 130 and viewing information of the other users inputted from the viewing-information-display control unit 146 described later.

The level-setting instructing unit 134 transmits, on the basis of a user input to the input unit 140, a level setting instruction including sharing level information of the user of the content viewing apparatus 10 (user correlation information, information disclosure level information, information acquisition level information, etc.) to the information management server 20 and instructs level setting for these kinds of information. Details of shared level information are described later.

The viewing-information generating unit 136 generates viewing information of a content by the user in the content viewing apparatus 10. The viewing-information generating unit 136 generates viewing history of the user of the content on the basis of, for example, a viewing history inputted from the content managing unit 120, user input data to the input unit 140, a viewing space recognized by the recognizing unit 138, video and sound data of the user, or the like. The viewing-information transmitting unit 142 transmits the viewing information generated by the viewing-information generating unit 136 to the information management server 20 via the network 5.

Viewing information is explained in detail. The viewing information is information representing a viewing content (any one of a content viewed by the user in the past in the content viewing apparatus 10, a content presently viewed, and a content scheduled to be viewed in future; the same applies in the following explanation) (see FIG. 11). The viewing information is information different for each of the users of the content viewing apparatuses 10. It is possible to grasp tastes of contents of the users in the content viewing apparatuses 10 using such viewing information.

The viewing information according to this embodiment includes, for example, (1) information concerning a viewing content in the content viewing apparatus 10 (hereinafter, "viewing content information"),
(2) information representing enthusiasm of the user in content viewing (hereinafter, "enthusiasm information"),
(3) viewing state information representing a viewing state of the user with respect to a content, and
(4) information representing ON and OFF of a power supply for the content viewing apparatus 10.

The viewing content information in (1) includes identification information (e.g., a channel, a content ID, and a program name) of the viewing content in the content viewing apparatus 10. It is possible to specify a content that the user is viewing (or viewed or plans to view) according to the viewing content information.

The enthusiasm information in (2) is, for example, information representing thoughts of the user on the viewing content, information representing whether the viewing state of the user is "viewing a content while doing other things" or "glued", or information representing feelings of the user. As a method of acquiring the enthusiasm information, for example, there are input of text information to the input unit 140 by the user (e.g., "enjoyable" or "tedious"), input of parameters (e.g., an enthusiasm index "0 to 100%"), and selection input concerning options representing enthusiasm displayed on a screen (e.g., button selection for marks of feelings). It is possible to grasp tastes and feelings of the other users and sympathizes with the other users about content viewing according to the enthusiasm information.

The viewing state information in (3) represents a viewing state of the user indicating when, where, and with whom the user of the content viewing apparatus 10 viewed a content, which content the user viewed, how long and in what kind of method the user viewed the content. For example, information concerning viewing time of a content such as viewing start time and viewing duration can be obtained from reproduction execution time and recording time for a content presently broadcasted or a content recorded in the past, time of a future content scheduled to be recorded, and the like. Information such as presence or absence of the user near the content viewing apparatus 10, face recognition and voice recognition for the viewing user, and the number of viewers can be obtained by applying image processing and sound processing to image or video data obtained by using the recognizing unit 138 (a camera, a microphone, a sensor, etc.) provided in the content viewing apparatus 10. It is possible to grasp viewing states of the other users according to the viewing state information.

It is possible to grasp presence or absence of viewing of the other users and presence or absence of the user in an installation location of the content viewing apparatus 10 (e.g., a home of the user) according to the information representing ON and OFF of the power supply for the content viewing apparatus 10 in (4).

The details of the viewing information according to this embodiment are explained above. The viewing-information generating unit 136 shown in FIG. 3 generates viewing information (see FIG. 11) as explained above. The viewing-information transmitting unit 142 transmits the viewing information to the information management server 20*b* via the network 5. The viewing information is transmitted to the information management server 20, for example, every time a content is viewed or every time record scheduling or viewing scheduling is executed. However, the present invention is not limited to such an example. The viewing information may be periodically transmitted. Alternatively, the viewing information may be transmitted at arbitrary timing such as at the time when the power supply for the content viewing apparatus 10 is turned on or at the time when a request from the information management server 20 is received.

The viewing-information receiving unit 142 receives viewing information of the other users from the information management server 20 via the network 5. The received viewing information of the other users is appropriately filtered information among viewing information of a large number of users. Details of this filtering are described later.

The viewing-information-display control unit 146 performs image processing necessary for displaying the viewing information of the other users inputted from the viewing-information receiving unit 142 on the display unit 132. For example, the viewing-information-display control unit 146 converts the received viewing information of the other users into user information representing the other users (e.g., marks, icons, face images, etc. allocated to the respective users) and displays the viewing information. Alternatively, the viewing-information-display control unit 146 displays the received viewing information of the other users in a program guide format by associating the viewing information with a program guide of contents. The viewing-information-display control unit 146 adjusts a display position, a size, a display area, and the like of the viewing information of the other users in the screen of the display unit 130.

The superimposing unit 148 superimposes an image of information on the other users outputted from the viewing-information-display control unit 146 on an image of a video content outputted from the content-display control unit 130 and displays the image. Consequently, together with a video of a content being reproduced, the information on the other users who are viewing (or viewed or schedules to view) the content is displayed in parallel on the display unit 132 of the content viewing apparatus 10. Therefore, the user can grasp the other users who are viewing a content that the user is viewing. A specific example of a display screen in which viewing information of the other users is superimposed is described later.

The user can operate the content viewing apparatus 10 using not only the input unit 140 but also a remote controller 3. For example, the user can dynamically adjust a sharing level of viewing information of the other users by operating a lever of the remote controller 3 while viewing a content. Details of the adjustment are described later.

Figure 4:
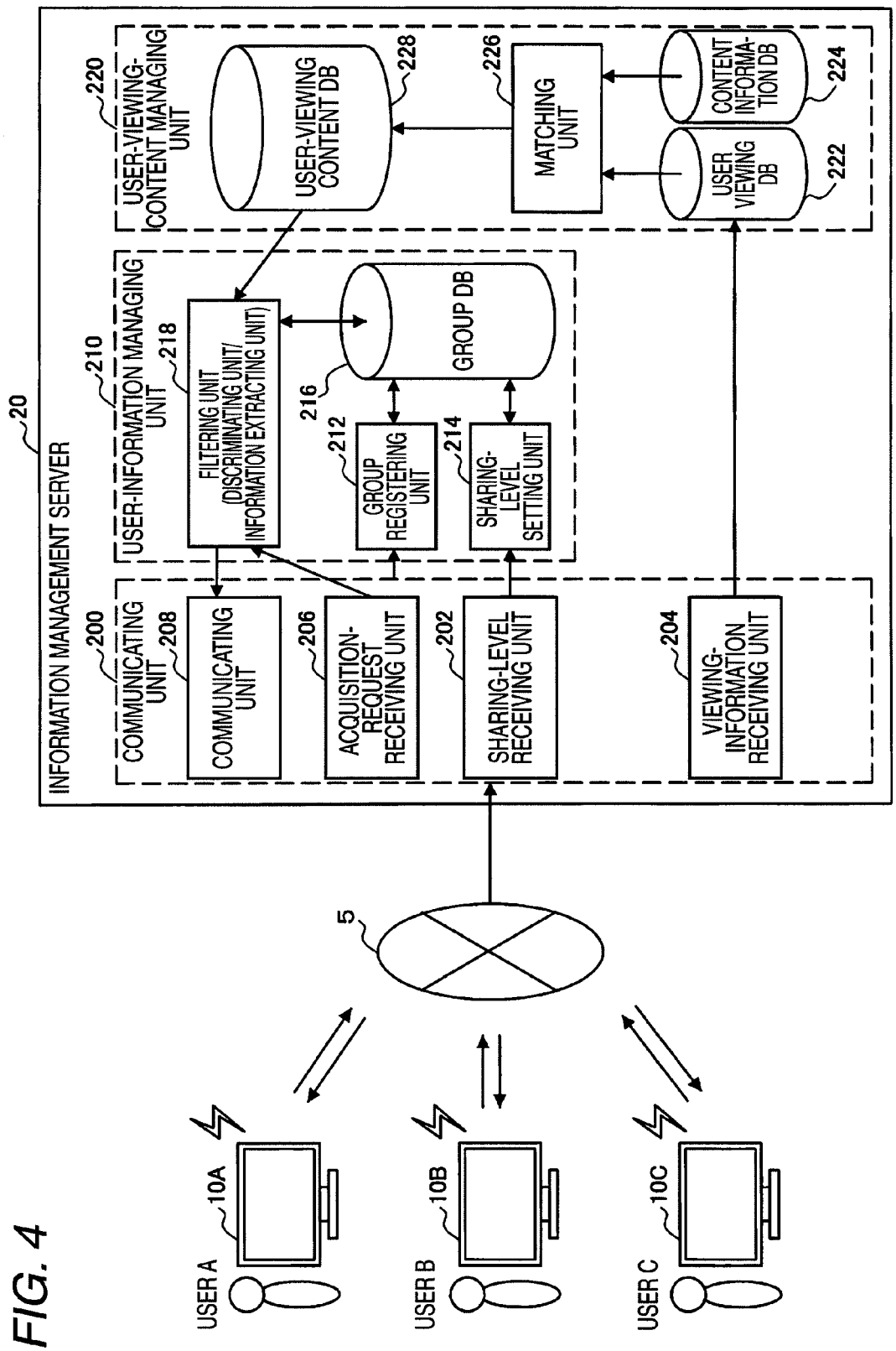
FIG. 4 is a block diagram of a configuration of the information management server according to the embodiment.

A configuration of the information management server 20 according to this embodiment is explained with reference to FIG. 4. FIG. 4 is a block diagram of the configuration of the information management server 20 according to this embodiment. In the following explanation, FIGS. 8 to 18 are referred to as appropriate in order to explain information treated by the information management server 20 and the structure of a database.

As shown in FIG. 4, the information management server 20 schematically includes a communication unit 200 that performs data communication with the content viewing apparatuses 10 of the respective users via the network 5, a user-information managing unit 210 that manages sharing level information among plural users belonging to an identical group, and a user-viewing-content managing unit 220 that manages content viewing information of the respective users.

The communication unit 200 includes a sharing-level receiving unit 202, a viewing-information receiving unit 204, an acquisition-request receiving unit 206, and a viewing-information transmitting unit 208. The sharing-level receiving unit 202 receives sharing level information instructed to be set by the respective users from the content viewing apparatuses 10 of the respective users. The viewing-information receiving unit 204 receives viewing information of the respective users from the content viewing apparatuses 10 of the respective users. The acquisition-request receiving unit 206 receives, from the content viewing apparatus 10 of a certain user, a viewing information request as a command for requesting acquisition of viewing information of the other users. The viewing-information transmitting unit 208 transmits viewing information of the other users corresponding to the respective users, which is generated by a filtering unit 218 described later, to the content viewing apparatuses 10 of the respective users.

The user-information managing unit 200 includes a group registering unit 212, a sharing-level setting unit 214, a group database 216 (hereinafter referred to as "group DB 216"), and the filtering unit 218. The group registering unit 212 registers the users of the content viewing apparatuses 10 in groups. The sharing-level setting unit 214 sets sharing level information among users in an identical group. The group DB 216 stores group information and sharing level information. The filtering unit 218 discriminates (filters) viewing information provided to the content viewing apparatuses 10. These units are described in detail below.

The group registering unit 212 groups the users of the content viewing apparatuses 10 into a specific group or community and registers the users in the group DB 216 in groups. For example, like a groups in a SNS (Social Networking Service), this user group can be arbitrarily set according to various user attributes (age, sex, hobby, taste, residence region, work, friendship, etc.). When the group registering unit 212 receives a group registering request from the user of the content viewing apparatus 10, the group registering unit 212 performs user authentication processing and, then, generates and registers a new group or registers the new group in addition to the existing group. For example, as shown in FIG. 8, the group registration is executed by registering, in the group DB 216, group information in which user IDs of users belonging to a group and user names of the users are associated. The group DB 216 is stored in the storage device 110 (see FIG. 2) of the information management server 20.

The sharing-level setting unit 214 sets sharing level information among the users belonging to the identical group on the basis of level setting instructions received from the content viewing apparatuses 10 of the respective users. The level setting instructions are commands received from the content viewing apparatuses 10 by the sharing-level receiving unit 202. Sharing level information instructed to be set by the respective users is included in the level setting instructions. The sharing level information is information representing a sharing level of viewing information among plural users belonging to an identical group. The sharing level information includes user correlation information, information disclosure level information, and information acquisition level information.

Figure 5:
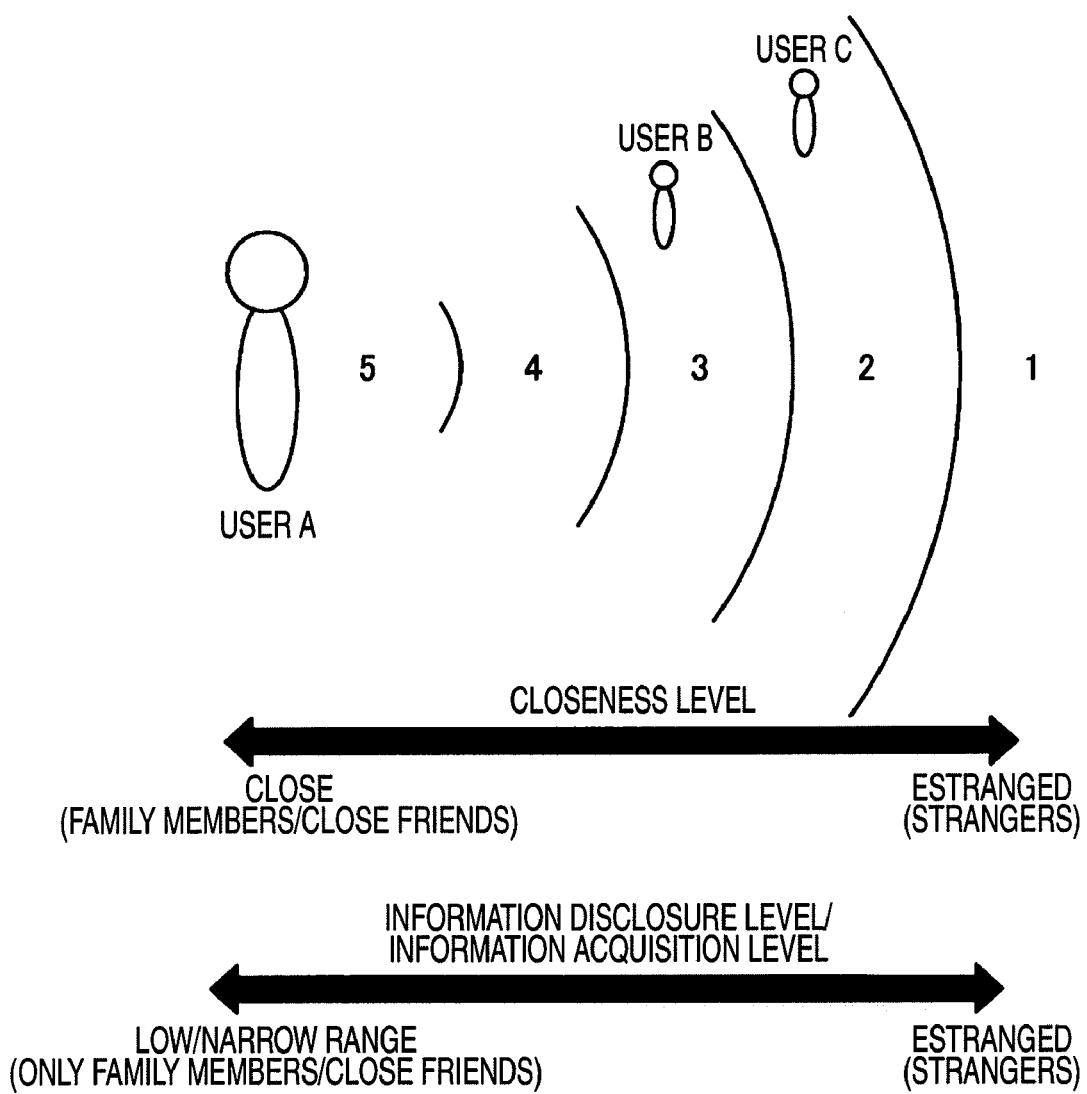
FIG. 5 is a conceptual diagram of user correlation information (a closeness level) according to the embodiment.

The user correlation information is information representing a closeness level among the users belonging to the identical group and is set at a level value corresponding to closeness among the users. FIG. 5 is a conceptual diagram of the user correlation information (the closeness level). As shown in FIG. 5, a level value of the user correlation information (a closeness level value) is set in, for example, level values in five stages (1 to 5). As the closeness among the users is higher, the level value of the user correlation information is larger. For example, when the closeness level is high, for example, among family members or close friends, the level value of the user correlation information is set to "5". When the closeness level is low, for example, among strangers, the level value is set to "1".

The user A sets level values of the user correlation information for the respective other users B, C, and the like in the group, respectively. In other words, the user A operates the content viewing apparatus 10, inputs desired level values of user correlation information with respect to the respective other users B, C, and the like and instructs to set the level values. Then, a setting instruction including the user correlation information of the set level values is transmitted from the content viewing apparatus 10 to the information management server 20. The information management server 20 sets the received level values in the group DB 216 as the user correlation information of the user A (see FIG. 9).

A specific example of the user correlation information (the closeness level information) is shown in FIG. 9. As shown in FIG. 9, for each of the three users A to C, a level of correlation information with the other users is set. Concerning the user A, a closeness level value of the user B with a user ID "0002" is set to "3". It is seen that the user A and the user B are in a relation with a medium degree of closeness (normal acquaintances, etc.). A closeness level value of the user C with a user ID "100031" is set to "2". It is seen that the user A and the user C are in a relation with slightly low closeness (colleges in a company, etc.). A closeness level value of the user D with a user ID "0004" is set to "5". It is seen that the user A and the user D are in a relation with highest closeness (family members, close friends, etc.).

Such level values of the user correlation information serve as a reference in performing filtering of viewing information of the other users on the basis of information disclosure level information and information acquisition level information described later. Therefore, the user correlation information is statically set in advance by the respective users. The level values can be set and changed as appropriate but is not dynamically set and changed during content viewing or the like.

The information disclosure level information and the information acquisition level information are explained. The information disclosure level information is information representing a range of other users to whom a certain user permits disclosure of viewing information of the user (e.g., a closeness level). The information acquisition level information is information representing a range of other users from whom a certain user acquires viewing information (e.g., a closeness level).

In the same manner as the user correlation information (the closeness level), the information disclosure level information and the information acquisition level information are also set to level values corresponding to an information disclosure level or an information acquisition level desired by the user. In the example shown in FIG. 5, for example, the level value of the information disclosure level information and the level value of the information acquisition level information (hereinafter referred to as "information disclosure level value" and "information acquisition level value", respectively) are set to, for example, level values in five stages (1, 2, 3, 4, and 5). A user for whom a level value of the user correlation information (a closeness level value) is set higher than the information disclosure level value and the information acquisition level value is included in a user range of an information disclosure object and an information acquisition object.

For example, in the example shown in FIG. 5, the closeness levels of the users B and C with respect to the user A are "3" and "2", respectively. In this case, if the information disclosure level value and the information acquisition level value set by the user A are "3", the user B is included in the information disclosure object and the information acquisition object of the user A (closeness level value "3"≧information disclosure and information acquisition levels "3"). However, the user C is not in the information disclosure object and the information acquisition object of the user A (closeness level value "2"<information disclosure and information acquisition levels "3"). If the information disclosure level value and the information acquisition level value set by the user A are "1", the users B and C are included in the information disclosure object and the information acquisition object of the user A (closeness level values "3" and "2"≧information disclosure and information acquisition level values "1").

In the same manner as the user correlation information (the closeness level), the information disclosure level information and the information acquisition level information are set on the basis of a user input to the content viewing apparatus 10. In other words, the user A operates the content viewing apparatus 10, inputs information disclosure values and information acquisition level values with respect to the other users B, C, and the like, and instructs setting of the level values. Then, a setting instruction including the set information disclosure level value and information acquisition level value is transmitted from the content viewing apparatus 10 to the information management server 20. The information management server 20 sets the received level values in the group DB 216 as information disclosure level information and information acquisition level information of the user A (see FIG. 10).

A specific example of the information disclosure level information and the information acquisition level information is shown in FIG. 10. As shown in FIG. 10, for each of the three users A to C, information disclosure level values and information acquisition level values with respect to the other users are set in association with user IDs. For example, concerning the user A, the information disclosure level value is set to "3" and the information acquisition level value is also set to "3". Consequently, it is seen that the user A permits disclosure of viewing information of the user A to other users with a medium degree of closeness (normal acquaintances, etc.) among the users in the group and desires to acquire viewing information of the other users in the relation.

If the information disclosure level value and the information acquisition level value are set to an identical level value, it is possible to equally share viewing information with the other users. If the information disclosure level value and the information acquisition level value are set in a relation of "information disclosure level value>information acquisition level value", it is possible to set an acquisition range of viewing information wider than a disclosure range of viewing information. Conversely, if the information disclosure level value and the information acquisition level value are set in a relation of "information disclosure level value<information acquisition level value", it is possible to set a disclosure range of viewing information wider than an acquisition range of viewing information. As explained above, the user can freely set the information disclosure level value and the information acquisition level value according to a relation with the other users in the group and a range of users who desire to share (disclose and acquire) viewing information.

Unlike the level value of the user correlation information, the information disclosure level value and the information acquisition level value can be freely set according to a desire of the user at an arbitrary point. Therefore, for example, when the user is viewing a content using the content viewing apparatus 10, the user can dynamically set and change the information disclosure level value and the information acquisition level value. It is possible to dynamically change, according to such dynamic setting and changing, a range of viewing information of the other users displayed on the content viewing apparatus 10.

As explained above, the sharing-level setting unit 214 sets, on the basis of the level setting instructions from the content viewing apparatuses 10 of the respective users, the information disclosure level and the information acquisition level among the users belonging to the group in the group DB 216.

The filtering unit 218 is explained. After executing filtering on the basis of the sharing level information among the users set in the group DB 216 as explained above, the filtering unit 218 extracts, in response to requests from the respective users, viewing information of the other users associated with a content being viewed from a user viewing content database 228 of the user-viewing-content managing unit 220 described later. The filtering unit 218 provides the content viewing apparatuses 10 of the respective users with the viewing information.

The filtering unit 218 is an example of a discriminating unit and an information extracting unit of the present invention. The discriminating unit has a function of discriminating, in response to a viewing information request from another user received from the content viewing apparatus 10, other users matching a condition of the sharing level information (the user correlation information, the information disclosure level information, and the information acquisition level information) set in the group DB 216 out of the other users belonging to the group identical with the group to which the user of the content viewing apparatus at the request source belongs. The information extracting unit has a function of extracting viewing information of the other users discriminated by the discriminating unit from the user viewing content database 228.

The filtering unit 218 filters, on the basis of the information disclosure level and the information acquisition level set by the respective users, the viewing information of the other users provided to the content viewing apparatuses 10. Consequently, it is possible to perform privacy management by limiting, according to user setting, the other users to whom viewing information is disclosed and adjusting a range of the other users from whom the user desires to acquire viewing information. Details of the filtering processing are described later (see FIG. 21).

The user-viewing-content managing unit 220 shown in FIG. 4 is explained. The user-viewing-content managing unit 220 includes a user viewing database 222 (hereinafter referred to as "user viewing DB 222"), a content information database 224 (hereinafter referred to as "content information DB 224"), a matching unit 226, and a user viewing content database 228 (hereinafter referred to as "user viewing content DB 228"). The user viewing DB 222, the content information DB 224, and the user viewing content DB 228 are stored in the storage device 110 (see FIG. 2) of the information management server 20 or the like. The respective units are explained below.

The user-viewing-content managing unit 220 collects viewing information of contents of the respective users from the respective content viewing apparatuses 10 and stores the viewing information in the user viewing DB 222. In this way, the viewing information of the respective users received from the respective content viewing apparatuses 10 by the viewing-information receiving unit 204 is stored in the user viewing DB 222. A specific example of the viewing information is explained below.

A specific example of viewing information of the user A transmitted from the content viewing apparatus 10 to the information management server 20 is shown in FIG. 11. As shown in FIG. 11, when the user is viewing a program content of a television broadcast or a VOD content in the content viewing apparatus 10, viewing information is generated by the content viewing apparatus 10 and transmitted to the information management server 20. The viewing information includes, for example, a medium that provides the viewing content, a channel, a content ID, viewing start time, viewing duration, and a viewing plan of a content in future (viewing scheduling, record scheduling, etc.). It is possible to specify a viewing content of the user according to the content ID as identification information of the content, the viewing plan, and the medium, the channel, the viewing start time, and the like as content attribute information. It is possible to grasp a viewing state of the content according to the viewing duration and the like.

The user-viewing-content managing unit 220 analyzes viewing information transmitted from the plural content viewing apparatuses 10, classifies the viewing information for each of the users, and stores the viewing information in the user viewing DB 222. At this point, the user-viewing-content managing unit 220 adds user IDs, viewing IDs, and viewing attributes of the content viewing apparatuses 10, which transmit the viewing information, to the viewing information.

A specific example of the viewing information of the user A stored in the user viewing DB 222 is shown in FIG. 12. As shown in FIG. 12, information concerning the viewing content of the user A (e.g., a viewing ID, viewing date and time, identification information of a content, and viewing attributes) is arrayed in the user viewing DB 222, for example, in time series. The "viewing ID" is an ID peculiarly given in every viewing of a content by the user A. The "viewing date and time" is viewing date and time of the viewing content. The "identification information of a content" is a channel and a content ID in the example shown in the figure. Besides, a G code and the like used for record scheduling may be used. When only the content ID is used as the identification information of a content, it is necessary that the content can be uniquely specified only by the content ID. Otherwise, for example, a combination of the content ID and the viewing date and time may be used.

The "viewing attributes" are attribute information for classifying the viewing content according to the viewing date and time. Among the "viewing attributes", a "history in the past" represents that the user A viewed a content broadcasted in the past, a "present state" represents that the user A is presently viewing a content presently being broadcasted, and a "viewing plan" represents that the user A recording-schedules or viewing-schedules a content to be broadcasted in future and plans to view the content.

The information concerning the viewing content described above is stored in the user viewing DB 222 for each of the users in the group. In the example shown in FIG. 12, the enthusiasm information, the viewing state information, and the like are not shown. However, when these kinds of information are included in the viewing information, the viewing information is stored in the user viewing DB 222.

The content information DB 224 is explained. The content information DB 224 stores information concerning plural contents that can be provided to the respective content viewing apparatuses 10 from the content providing apparatus (the broadcasting apparatus 7, the content delivery server 9, etc. shown in FIG. 1), for example, a program guide of contents of a television broadcast. For example, the content information DB 224 is a database obtained by adding meta-information and attribute information concerning contents to an electronic program guide (EPG) of the television broadcast and changing the electronic program guide to a database of metadata suitable for a system. The user-viewing-content managing unit 220 of the information management server 20 acquires a program guide from an external program guide providing apparatus (e.g., an EPG provider) or the like via the network 5 or the like. The user-viewing-content managing unit 220 stores the program guide in the content information DB 220 after adding predetermined meta-information and attribute information necessary for use in the content sharing system 1 to the program guide.

A specific example of the program guide stored in the content information DB 222 is shown in FIG. 13. As shown in FIG. 13, a program guide of plural contents that can be provided to the content viewing apparatuses 10 (i.e., plural contents that can be viewed in the content viewing apparatuses 10) is stored in the content information DB 222. The program guide is time-series information of content IDs in respective channels. In the program guide of the example shown in FIG. 13, date and time of provision of contents to the content viewing apparatuses 10 (broadcasting date and time, delivery date and time, etc.), content IDs of program contents of a predetermined broadcasting channels broadcasted from the broadcasting apparatus 7, and content IDs of program contents of a predetermined delivery channel delivered from the content delivery server 9 are associated. With the program guide, it is seen that, for example, in a time frame of 12:00, program contents with a content ID "03" are broadcasted in a broadcasting channel and program contents with a content ID "13" are delivered in a delivery channel.

The matching unit 226 shown in FIG. 4 is explained. The matching unit 226 matches the user viewing DB 222 and the content information DB 224 and establishes the user viewing content DB 228. The user viewing content DB 228 is a database in which content IDs of plural contents (contents in a program guide) that can be provided to the content viewing apparatuses 10 and user IDs (viewing user information) of users who view the contents are associated (see FIG. 14). The user viewing content DB 228 represents viewing contents of users in an identical group.

Figure 6:
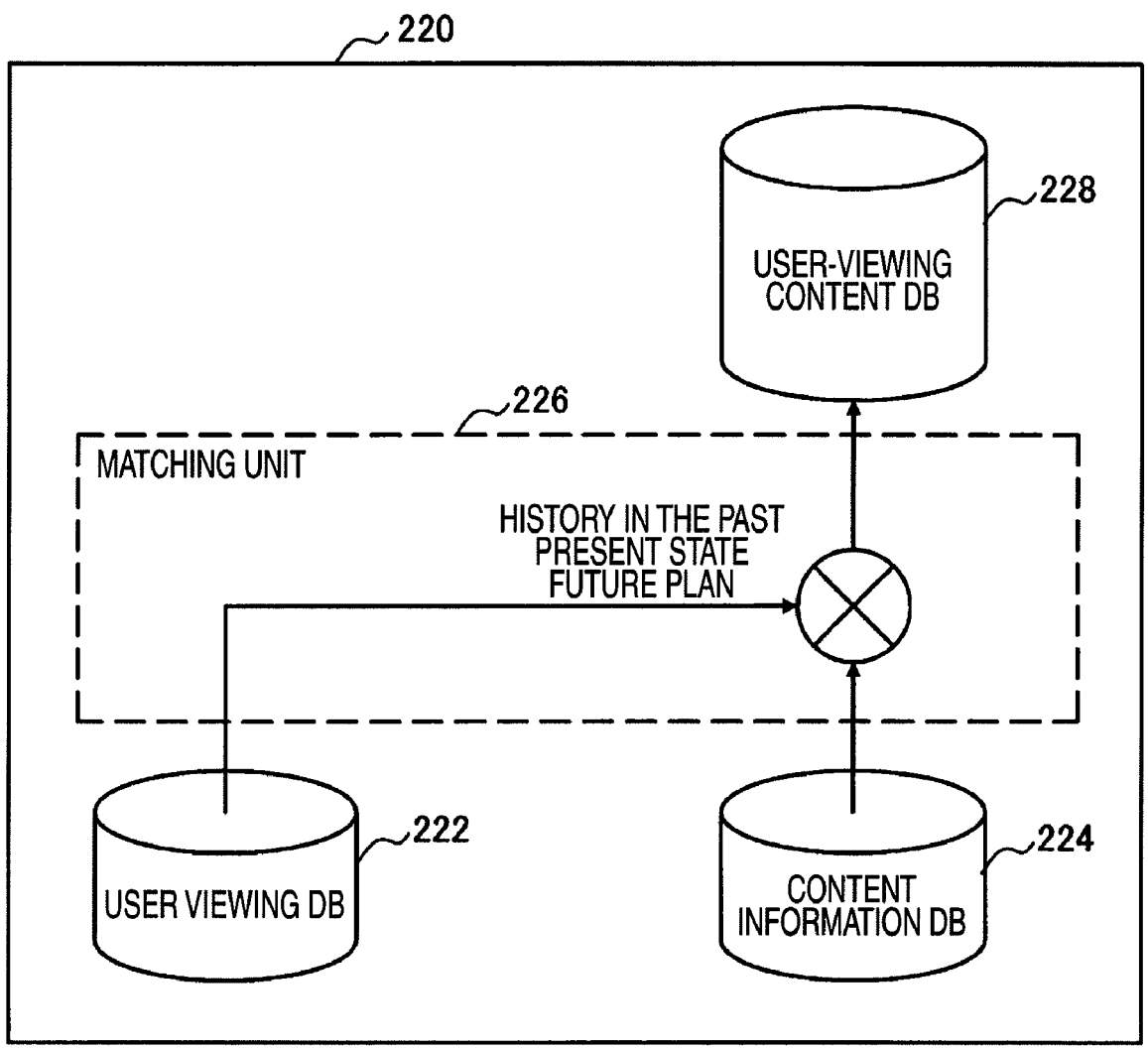
FIG. 6 is a block diagram of a user-viewing-content managing unit according to the embodiment.

The matching unit 226 is further explained with reference to FIG. 6. As shown in FIG. 6, the matching unit 226 collates identification information (content IDs) of contents included in the program guide read out from the content information DB 224 and identification information (content IDs, channels, viewing time, etc.) of viewing contents of the users read out from the user viewing DB 222 and associates respective contents included in the program guide with user IDs of users who view the respective contents. Consequently, the user viewing content DB 228 as information obtained by sorting viewing information of the plural users belonging to the group with the contents in the program guide is obtained (see FIG. 14). In this embodiment, all viewing contents with the viewing states "history in the past", "present state", and "viewing plan" are associated with the contents of the program guide, which is the time-series information, according to such matching.

A specific example of the user viewing content DB 228 is shown in FIG. 14. As shown in FIG. 14, provision date and time of contents, content IDs of contents of respective broadcast channels broadcasted to the content viewing apparatuses 10, and viewing user information (user IDs) representing users who viewed the contents are associated. For example, a user ID of the user A is associated with a content with a content ID "01" broadcasted in the past. It is seen that only the user A among the users A, B, C, and the like in the group viewed the content. Similarly, user IDs of the users A, B, and C are associated with a content with a content ID "03" being presently broadcasted. It is seen that the users A, B, and C are presently viewing the content. A user ID of no user is associated with a content with a content ID "02" broadcasted in the past. It is seen that a user who viewed the content is not present in the group. A user ID of the user D and a viewing probability "80%" thereof are associated with a content with a content ID "04" to be broadcasted in future. As the viewing probability, a predetermined value "80%" may be typically allocated when record scheduling is performed. Alternatively, the viewing probability may be calculated on the basis of viewing histories of users in the past, viewing probabilities of other record-scheduled contents, and the like.

As explained above, the user-viewing-content managing unit 220 generates the user viewing content DB 228 and, every time new viewing information is received from the content viewing apparatus 10, for example, adds, deletes, or changes viewing user information and updates the user viewing content DB 228. Since the user-viewing-content managing unit 220 manages the user viewing content DB 228 in this way, the information management server 20 can typically store a content program guide in which latest viewing user information is associated with contents.

The filtering unit 218 of the user-information managing unit 210 is explained in detail again. The filtering unit 218 filters, on the basis of the sharing level information set in the group DB 216, the viewing user information included in the user viewing content DB 228.

Specifically, first, when the acquisition-request receiving unit 206 receives viewing information requests for requesting acquisition of viewing information of the other users from the respective content viewing apparatuses 10, the filtering unit 218 specifies the user A of the content viewing apparatus 10 at a request source and reads out, from the group DB 216, sharing level information set for a group identical with a group to which the user A at the request source belongs. Subsequently, the filtering unit 218 discriminates, on the basis of user correlation information (a closeness level value) included in the sharing level information of the group and an information acquisition level value of the user A, other users B to D at levels from which the user A acquires viewing information out of other users B to Z in the group (first filtering). The filtering unit 218 discriminates, on the basis of the user correlation information (the closeness level value) and information disclosure level values of the discriminated other users B to D, the user B, to whom the viewing information of the user A is disclosed, out of the discriminated other users B to D (second filtering).

Thereafter, the filtering unit 218 extracts viewing information (viewing user information, a content ID, date and time, etc.) of the user B discriminated out of the other users B to Z in the group from the user viewing content DB 228 and transmits the viewing information to the content viewing apparatus 10 of the user A at the request source.

The user viewing content DB 228 filtered for the user A is shown in FIG. 15. As shown in FIG. 15, in the user viewing content DB 228, among the viewing user information of the users A to D associated with the contents, viewing user information of the user C excluded by the filtering is deleted. Information in which the viewing user information (the user IDs), the content IDs, and the date and time of the users B and D excluding the user C are associated is transmitted from the user viewing content DB 228 to the content viewing apparatus 10 of the user A as viewing information of the other users. Consequently, the user A can acquire the viewing information of the other users B and D in a user range from which the user A acquires information and to which the user A discloses information. This makes it possible to provide the user A with viewing information of users with closeness desired by the user A while protecting privacy of the users B to Z in the group.

As explained above, sharing level information is set in the information management server 20 according to this embodiment. Viewing information of the users corresponding to the respective content viewing apparatuses 10 is filtered on the basis of the sharing level information. This makes it possible to manage privacy of the users in the group and execute adjustment of an information acquisition range according to preference of the users.

Figure 7:
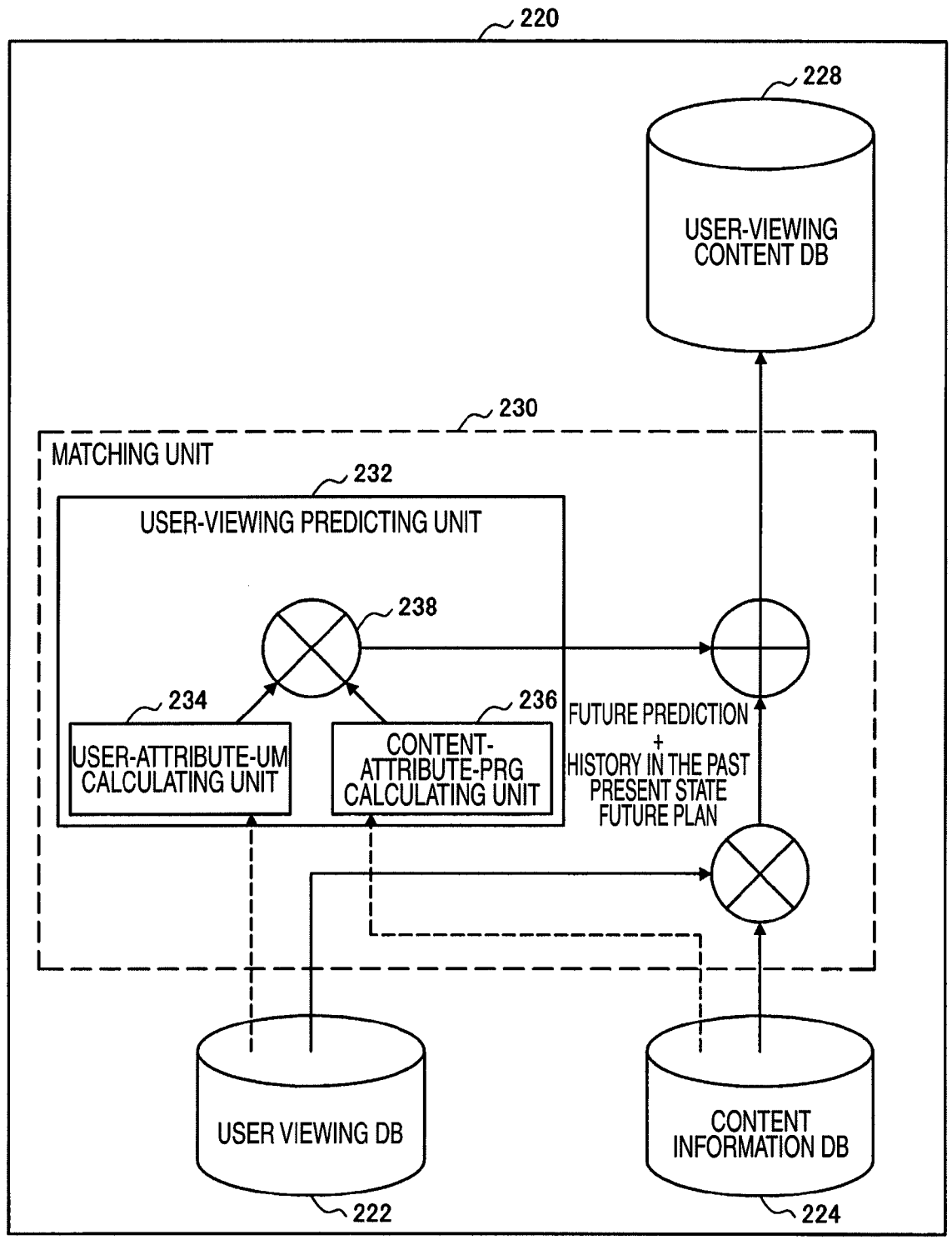
FIG. 7 is a block diagram of a user-viewing-content managing unit according to a modification of the embodiment.

A matching unit of the information management server 20 according to a modification of this embodiment is explained with reference to FIG. 7 and FIGS. 16 to 18. FIG. 7 is a block diagram of a configuration of the matching unit that performs future prediction according to the modification of this embodiment. FIGS. 16 to 18 are diagrams for explaining the structure of a database obtained as a result of performing the future prediction according to the modification of this embodiment.

The matching unit 226 of the user-viewing-content managing unit 220 generates the viewing content DB 228 including viewing user information with a viewing attribute "history in the past", "present state", or "viewing plan" (see FIG. 15). On the other hand, a matching unit 230 according to the modification generates viewing user information with a viewing attribute "viewing prediction" in addition to the viewing attribute "history in the past", "present state", or "viewing plan" and adds this information to the user viewing content DB 228 as viewing user information. The viewing attribute "viewing prediction" represents that a user is likely to view a content broadcasted in future. "Viewing prediction" is explained in detailed below.

The matching unit 230 generates, on the basis of a viewing history and preference of a user, viewing prediction information (e.g., a viewing probability 0 to 100%) of the user according to a predetermined estimation algorithm. Specifically, the matching unit 230 analyzes viewing prediction and record scheduling information obtained from the content viewing apparatus 10 of the user, the viewing history information accumulated in the information management server 20, and the like and calculates a probability that the user views a content planned to be broadcasted in future. For example, when a broadcast program is a content having continuity such as a drama, it is possible to grasp to a certain extent, by analyzing a viewing history of contents of episodes broadcasted in the past and presence or absence of viewing scheduling for the content of the next episode, whether the user views a content of the next episode. Even if the broadcast program is not a serial content, it is possible to judge a viewing tendency, preference, and the like of a user and calculate a probability that the user views similar contents by analyzing attribute information of contents that the user viewed in the past.

Therefore, the matching unit 230 shown in FIG. 7 calculates, on the basis of the viewing information of the user and using the predetermined estimation algorithm, a probability that the user views plural contents in future included in a program guide. In this way, the matching unit 230 performs viewing prediction. As the predetermined estimation algorithm, for example, an estimation algorithm employing the following formula 1 can be used. An overview of the viewing prediction is explained below. The following formula (1) is a formula for calculating a viewing probability (UM, PRG).

$$\text{Viewing probability}(UM, PRG) = \frac{\sum_i (UM(i) \times PRG(i))}{\sqrt{\sum_i UM(i)^2} \times \sqrt{\sum_i PRG(i)^2}} \quad (1)$$

In Formula (1), "UM" represents a user model vector and "PRG" represents a program vector.

The program vector (PRG) is a vector representing a characteristic of a content (a program). The program vector (PRG) is calculated by data-mining content metadata. For example, a genre of a content, a performer, a keyword extracted from an explanatory note, and the like are elements of the content vector.

The user model vector (UM) is a vector representing a taste of the user. The user model vector (UM) is calculated by learning processing based on an operation log of a content viewing action of the user (e.g., when recording processing for a certain program is performed, adding contents (a performer and a keyword) included in the program vector to the user model vector (UM)) and initial input by the user (e.g., added to the user model vector (UM) on the basis of input of a favorite genre, entertainer, and the like).

It is possible to calculate viewing probabilities (UM, PRG) of the respective contents by applying the user model vector (UM) and the program vector (PMG) to Formula (1), calculating a degree of taste of the user with respect to the program, and normalizing degrees of taste for all the contents.

In order to execute the estimation algorithm described above, the matching unit 230 shown in FIG. 7 further includes a user-viewing predicting unit 232 in addition to the configuration shown in FIG. 6. The user-viewing predicting unit 232 predicts, on the basis of the viewing information of the respective users received from the respective content viewing apparatuses 10 and the attribute information of the contents included in the program guide in the content information DB 22, contents that the respective users are likely to view. The user-viewing predicting unit 232 calculates viewing probabilities of the contents. In the program contents included in the program guide, attribute information such as a category of a program, a cast, a genre, a viewing age, and a degree of variety is set in advance for each of the program contents. The user-viewing predicting unit 232 matches, for all the contents, the attribute information of the program contents and the taste information of the users and predicts viewing by the users.

The user-viewing predicting unit 232 includes a user-attribute-UM calculating unit 234, a content-attribute-PRG calculating unit 236, and a user-viewing-probability calculating unit 238.

The user-attribute-UM calculating unit 234 calculates the user model vector (UM) representing a taste of the users according to the learning processing based on the viewing information of the users read out from the user viewing DB 222, the initial input of the users, and the like. The content-attribute-PRG calculating unit 236 calculates the program vector (PMG) representing a characteristic of a content (a program) on the basis of the attribute information of the contents included in the program guide read out from the content information DB 224. The user-viewing-probability calculating unit 238 calculates the viewing probabilities (UM, PRG) of the users with respect to plural contents in future included in the program guide by applying the calculated user model vector (UM) and program vector (PMG) to Formula (1). The predetermined estimation algorithm is not limited to the example described above. For example, the estimation algorithm described in JP-A-2005-57713 may be used.

With the estimation algorithm described above, the matching unit 230 can predict contents that the users are likely to view among the contents included in the program guide and calculate viewing probabilities of the contents. The matching unit 230 adds the predicted viewing information of the users to the viewing information of the users in the user viewing DB 222.

For example, in the user viewing DB 222 shown in FIG. 16, as viewing prediction for the user A with respect to a content in future, viewing information in which a viewing ID "777", a content ID "1112233", viewing date and time "03/11 09:00", and a viewing attribute "viewing prediction (80%)" are associated is added.

The matching unit 230 generates the user viewing content DB 228 in which the contents in future included in the program guide of the content information DB 224 and the information concerning the viewing probability predicted by the user-viewing predicting unit 232 are associated.

Specifically, in the same manner as the matching processing unit 226 shown in FIG. 6, the matching unit 230 matches the user viewing DB 222 and the content information DB 224 and establishes the user viewing content DB 228 including the viewing user information "history in the past", "present state", and "future plan". The matching unit 230 adds the viewing user information predicted by the user-viewing predicting unit 232 to the user viewing content DB 228. For example, in the user viewing content DB 228 shown in FIG. 17, as viewing information of "future prediction" obtained by the viewing prediction, viewing user information of the user A (the user ID of the user A and the viewing probability 100%) and viewing user information of the user B (the user ID of the user B and the viewing probability 40%) are added to a content in future having a content ID "05". This means that the user A views the content with the content ID "05" at the viewing probability 100% and the user B views the content at the viewing probability 40%.

In this way, the user viewing content DB 228 including the predicted viewing user information is filtered by the filtering unit 218. According to the filtering, other users satisfying the condition of the sharing level information are discriminated and viewing information of the discriminated other users is extracted and provided to the content viewing apparatus 10.

The user viewing content DB 228 (including the future prediction) filtered for the user A is shown in FIG. 18. As shown in FIG. 18, in the user viewing content DB 228, in addition to the viewing user information of "history in the past", "present state", and "future plan" shown in FIG. 15, the viewing user information of "future prediction" is included. The content viewing apparatus 10 of the user A can present viewing prediction information of the other users to the user A by receiving information of the user viewing content DB 228 after the filtering.

The configuration of the information management server 20 according to this embodiment and the examples of the various kinds of information treated by the information management server 20 are explained above with reference to FIGS. 4 to 18.

Figure 19:
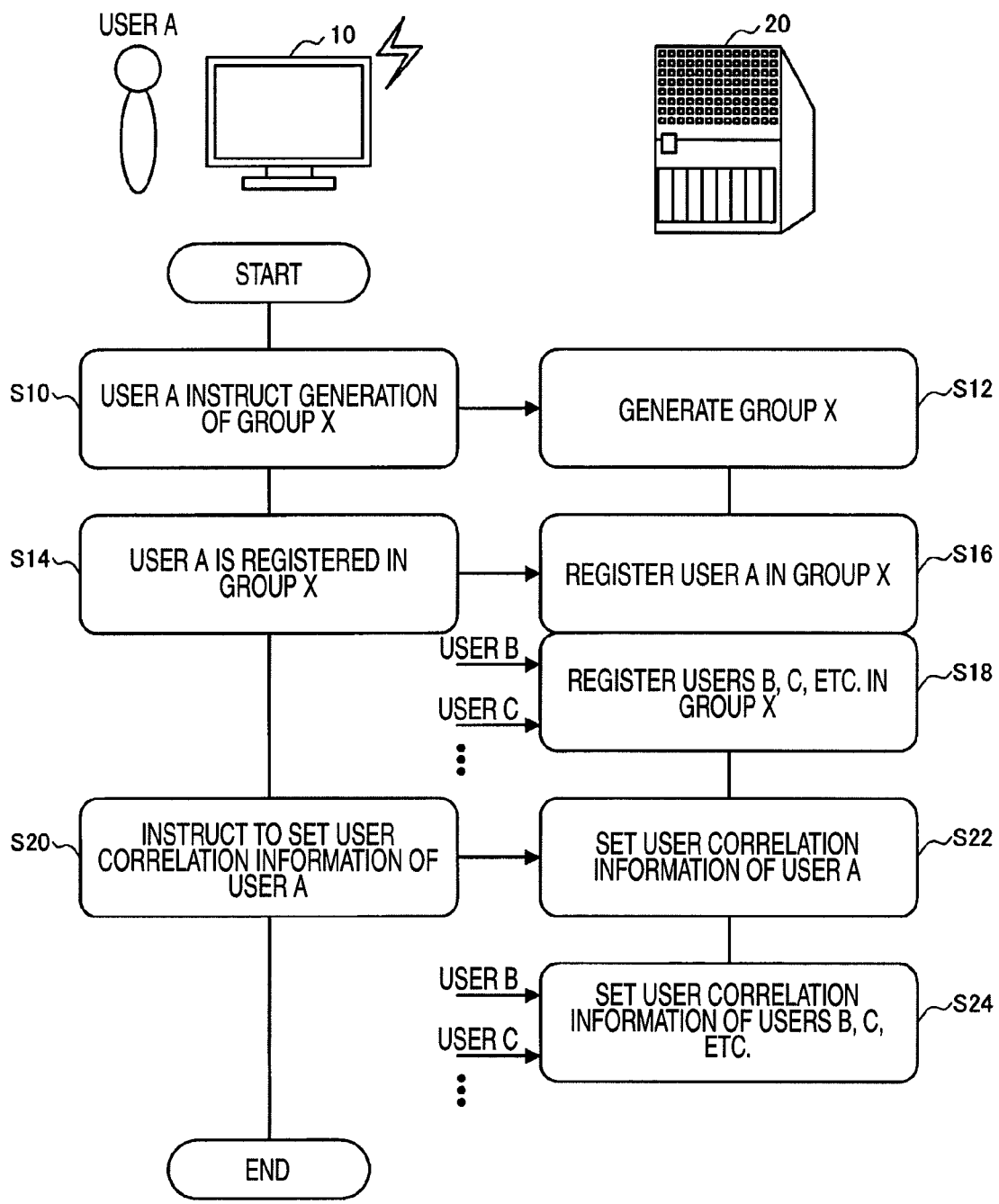
FIG. 19 is a flowchart of environment setting processing in the information sharing system according to the embodiment.

Environment setting processing in the information sharing system 1 according to this embodiment is explained below with reference to FIG. 19. FIG. 19 is a flowchart of the environment setting processing (group registration and user correlation information setting processing) in the information sharing system 1 according to this embodiment.

As shown in FIG. 19, first, the content viewing apparatus 10 of the user A transmits an instruction for generating a new group X to the information management server 20 on the basis of an input of the user A (step S10). According to the generation instruction, the information management server 20 generates the group X anew and registers the group X in the group DB 216 (step S12).

The content viewing apparatus 10 of the user A transmits an instruction for registering the user A in the group X to the information management server 20 (step S14). According to the registration instruction, the information management server 20 registers the user A in the group X (step S16). Specifically, the information management server 20 registers the user ID and the user name of the user A as group information of the group X of the group DB 216 (see FIG. 8). In the same manner, the information management server 20 registers the other users B, C, and the like in the group X (step S18).

The user A sets user correlation information (closeness level values) with respect to the users B, C, and the like belonging to the group X (steps S20 and S22). The content viewing apparatus 10 of the user A transmits, on the basis of an input of the user A, a setting instruction including the user correlation information (the closeness level values) between the user A and the users B, C, and the like to the information management server 20 (step S20). According to the setting instruction, the information management server 20 sets the user correlation information of the user A in the group DB 216 (step S22). Specifically, the information management server 20 sets closeness level values of the user A with respect to the other users B, C, and the like in the group DB 216 as the user correlation information of the user A (see FIG. 9). In the same manner, the other users B, C, and the like set user correlation information with respect to the other users in the group X (step S24). Basically, the setting of the user correlation information is statically performed before sharing of the viewing information in the content viewing apparatuses 10.

Consequently, a group DB is established in the information management server 20 and the environment setting for sharing the viewing information among the plural users A, B, C, and the like belonging to the identical group X is finished.

Figure 20:
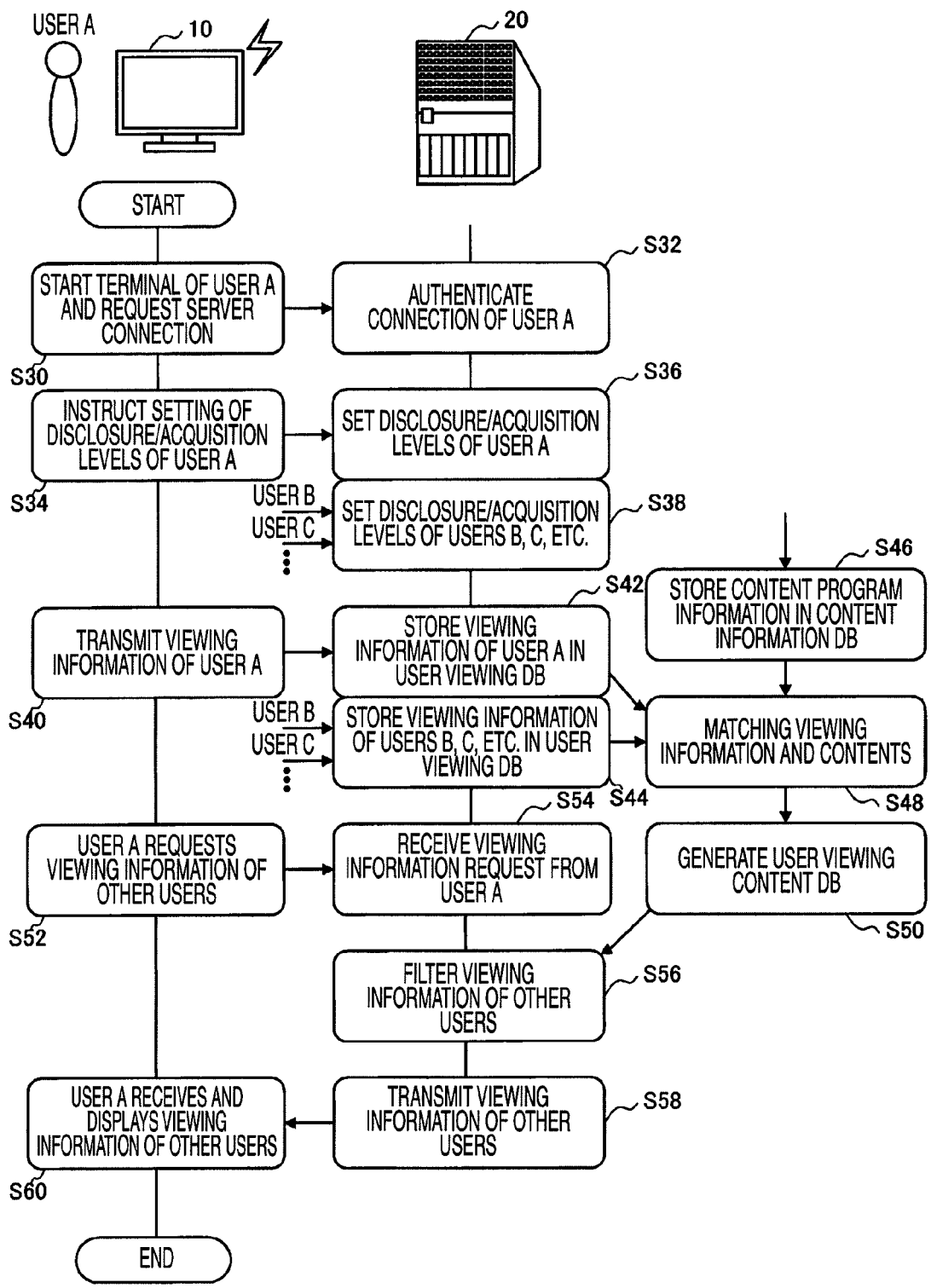
FIG. 20 is a flowchart of a viewing information sharing method in the information sharing system according to the embodiment.

A viewing information sharing method in the information sharing system 1 according to this embodiment is explained with reference to FIG. 20. FIG. 20 is a flowchart of the viewing information sharing method in the information sharing system 1 according to this embodiment.

As shown in FIG. 20, first, the user A starts the content viewing apparatus 10 and requests connection to the information management server 20 (step S30). In response to this request, the information management server 20 performs authentication for the user A and permits the connection of the content viewing apparatus 10 of the user A (step S32). Thereafter, the user A views a content of a desired channel using the content viewing apparatus 10.

Subsequently, the user A sets information disclosure level information and information acquisition level information with respect to the other users at an arbitrary content viewing point (steps S34 and S36). Specifically, the content viewing apparatus 10 of the user A transmits, on the basis of a user input, the information disclosure level information and the information acquisition level information of the user A with respect to the other users to the information management server 20 and instructs setting of these kinds of information (step S34). According to the setting instruction, the information management server 20 sets the information disclosure level information and the information acquisition level information received from the content viewing apparatus 10 of the user A in the group DB 216 (step S36). Specifically, the information management server 20 sets information disclosure level values and information acquisition level values of the user A with respect to the other users in the group X in the group DB 216 as the information disclosure level information and the information acquisition level information of the user A (see FIG. 10). In the same manner, the other users B, C, and the like set information disclosure levels and information acquisition levels with respect to the other users in the group X (step S38). The setting of the information disclosure level information and the information acquisition level information can be dynamically adjusted during content viewing in the content viewing apparatus 10.

Thereafter, during viewing of a content in the content viewing apparatus 10, the content viewing apparatus 10 transmits viewing information (e.g., viewing content information such as a viewing channel, a viewing location, and a content ID, viewing state information, and enthusiasm information) of the user A to the information management server 20 (step S40). The information management server 20 stores the viewing information received from the content viewing apparatus 10 of the user A in the user viewing DB 222 (step S42).

The viewing information may include not only information concerning a content presently viewed by the user A but also information concerning a content viewed in the past and a content planned to be viewed in future. The content viewing apparatus 10 may periodically transmit the viewing information of the user A or may transmit the viewing information of the user A at a point when a viewing content is changed. The transmitted viewing information is safely treated under privacy management by the user-viewing-content managing unit 220 of the information management server 20. However, it is also possible for the content viewing apparatus 10 of the user A not to transmit a part or all of the viewing information to the information management server 20 according to the information disclosure levels of the user A set in steps S34 and S36.

In the same manner, the content viewing apparatuses 10 of the users B, C, and the like transmit viewing information of the users B, C, and the like to the information management server 20. The information management server 20 stores the viewing information in the user viewing DB 222 (step S44). The information management server 20 collects viewing information of the respective users from the respective content viewing apparatus 10 and accumulates the viewing information in the user viewing DB 222 by repeating steps S40 to S44 (see FIG. 12).

While collecting the viewing information in this way, the information management server 20 establishes the content information DB 224 on the basis of a program guide such as an EPG acquired from the outside (step S46). Specifically, concerning various contents such as a broadcast, a package medium, video and sound contents of a delivery medium, and a game content, the user-viewing-content managing unit 220 of the information management server 20 collects and analyzes meta-information (e.g., broadcasting time, a program ID, and a content ID of a package medium) and attribute information (e.g., a performer, a genre, and a related content) of the respective contents. Consequently, the information management server 20 generates program information of a content suitable for the information sharing system 1 and stores the program information in the content information DB 224 (see FIG. 13).

Subsequently, the information management server 20 matches the viewing information of the respective users acquired from the respective content viewing apparatuses 10 and stored in the user viewing information DB 222 and the content program information (the program guide) stored in the content information DB 224 (step S48) and establishes the user viewing content DB 228 (step S50). The user viewing content DB 228 is information in which contents included in the content program information and viewing user information of the contents are associated (see FIGS. 14 and 17). In the user viewing content DB 228, the viewing user information of the users in the group X is sorted in time series with the contents in the program information. The user viewing content DB 228 represents which user views which content.

The content viewing apparatus 10 of the user A transmits a viewing information request to the other users on the basis of an input of the user A (step S52). The information management server 20 receives viewing information requests of the other users (step S54). The information managing server 20 extracts, after performing privacy management and optimum filtering according to sharing level setting among the users in the group X, the viewing information of the other users in the group X from the user viewing content DB 228 in response to the viewing information request from the content viewing apparatus 10 (step S56) and transmits the viewing information to the content viewing apparatus 10 of the user A (step S58). Details of the filtering are described later (see FIG. 21).

As a result, the content viewing apparatus 10 of the user A receives the viewing information of the other users from the information management server 20 and displays the viewing information of the other users in parallel to a reproduced video of a content being viewed (step S60). Consequently, the user A can learn, while viewing the content, information on the other users B, C, and the like in the group X who are viewing the content. At this point, it is possible to adjust a sharing level of viewing information even among users in an identical group by performing filtering corresponding to setting of information disclosure levels and information acquisition levels among the users.

Figure 21:
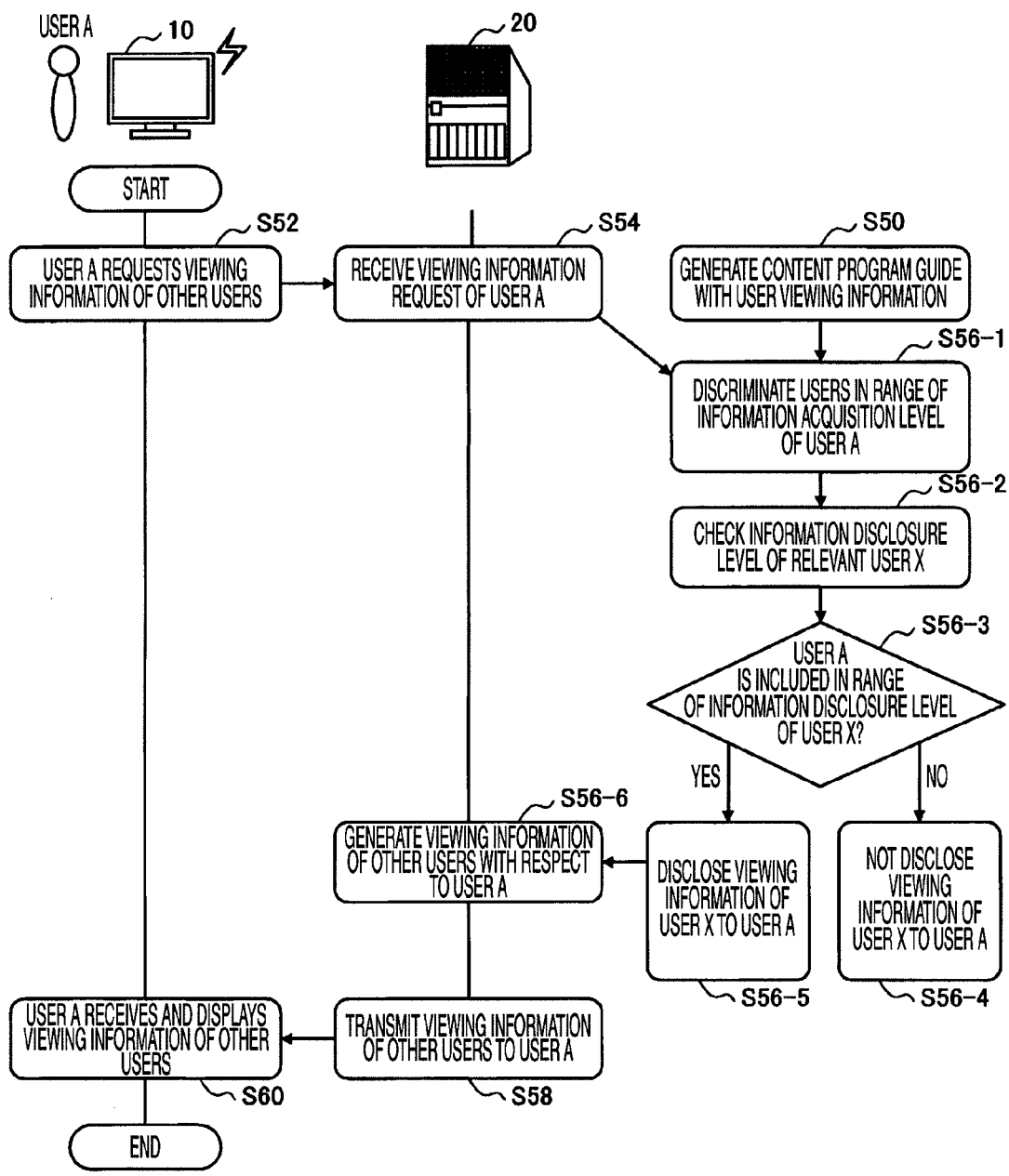
FIG. 21 is a flowchart of filtering processing in the information sharing system according to the embodiment.

The filtering of viewing information in the information sharing system 1 according to this embodiment is explained with reference to FIG. 21. FIG. 21 is a flowchart of the filtering in the information sharing system according to this embodiment. The processing shown in FIG. 21 corresponds to steps S50 to S60 shown in FIG. 20.

As shown in FIG. 21, the information management server 20 generates the user viewing content DB 228 in advance on the basis of viewing information received from the content viewing apparatuses 10 (step S50). As explained above, the user viewing content DB 228 is information obtained by adding viewing user information sorted for each of contents to program information of contents and is established as a content program guide with user viewing information.

In this state, the content viewing apparatus 10 of the user A transmits a viewing information request for the other users (step S52). The information management server 20 receives the viewing information request from the content viewing apparatus 10 at a request source (step S54) and executes filtering S56-1 to 56-6 (corresponding to step S56 shown in FIG. 20) described below.

First, the information management server 20 discriminates one or two or more users X at an information request level of the user A on the basis of the group DB 216 (step S56-1). Specifically, the information management server 20 specifies, referring to the group information in the group DB 216, users belonging to a group identical with a group to which the user A belongs. Subsequently, the information management server 20 reads out the information acquisition level information (the information acquisition level values) of the user A and the user correlation information (the closeness level value) concerning the user A set in the group DB 216 and compares the closeness level values of the user A with respect to the respective users and the information acquisition level value of the user A. According to a result of the comparison, the information management server 20 discriminates the user X whose closeness level value is equal to or higher than the information acquisition level value of the user A out of the users in the group (see FIG. 5). Such a user X is a user in a range of an information request level of the user A. The user discrimination processing in step S56-1 is first user discrimination processing based on the information acquisition level of the user A at a request source.

Subsequently, the information management server 20 checks information disclosure levels of the respective users X (step S56-2) and judges whether the user A is included in ranges of the information disclosure levels of the respective users X (step S56-3). As a result of the judgment, when the user A is not included in the ranges of the information disclosure levels of the respective users X, the information management server 20 determines not to disclose the viewing information of the users X to the user A (step S56-4). On the other hand, when the user A is included in the ranges of the information disclosure levels of the respective users X, the information management server 20 determines to disclose the viewing information of the users X to the user A (step S56-5).

Specifically, first, the information management server 20 reads out the information disclosure level information (the information disclosure level values) of the respective users X and the user correlation information (the closeness level values) of the respective users X with respect to the user A set in the group DB 216 and compares the closeness level values of the respective users X with respect to the user A and the information disclosure level values of the respective users X. According to a result of the comparison, the information management server 20 discriminates the user X whose closeness level value with respect to the user A is equal to or larger than the information disclosure level value of the user X (see FIG. 5). Such a user X is a user in a range of the information request level of the user A and is a user including the user A in a range of the information disclosure level of the user X. The user discrimination processing in steps S56-2 to 56-4 is second user discrimination processing based on the information disclosure levels of the other users X.

Subsequently, the information management server 20 extracts viewing information of the user X discriminated in this way from the user viewing content DB 228, generates viewing information of the other users X provided to the user A on the basis of the extracted information (step S56-6), and transmits the viewing information to the content viewing apparatus 10 of the user A (step S58).

Then, the content viewing apparatus 10 of the user A receives, from the information management server 20, the viewing information of the other users X provided to the user A and displays the viewing information in parallel to a content being viewed (step S60).

The filtering according to this embodiment is explained above. With the filtering, it is possible to limit, according to user setting, the other users to whom viewing information is disclosed and perform privacy management and it is possible to adjust a range of the other users from whom the user desires acquisition of viewing information.

An example of display of viewing information of the other users in the content viewing apparatus 10 according to this embodiment is explained.

As explained with reference to FIG. 3, the content viewing apparatus 10 can display the viewing information of the other users acquired from the information management server 20 on the display screen of the display unit 132 in parallel to a video of a content being reproduced. At this point, the viewing-information-display control unit 146 of the content viewing apparatus 10 can specify, on the basis of the viewing information of the other users received from the information management server 20, the other users who are viewing a content identical with the content that the user of the content viewing apparatus 10 is viewing. The viewing-information-display control unit 146 causes the display unit 132 to display user information representing the specified other users. As the user information, can be used arbitrary information such as text information (e.g., user names or texts representing nicknames), images (e.g., face photographs or portraits), icons (e.g., pictorial symbols representing faces of the other users), marks, figures, signs, or characters representing the other users as long as the information can identify the respective other users. In the following explanation, an example in which face icons are used as user information is mainly explained. However, the present invention is not limited to such an example.

FIGS. 22 to 26 are diagrams for explaining examples of a display screen for viewing information of the other users displayed together with a content being reproduced in the content viewing apparatus 10 according to this embodiment.

Figure 22:
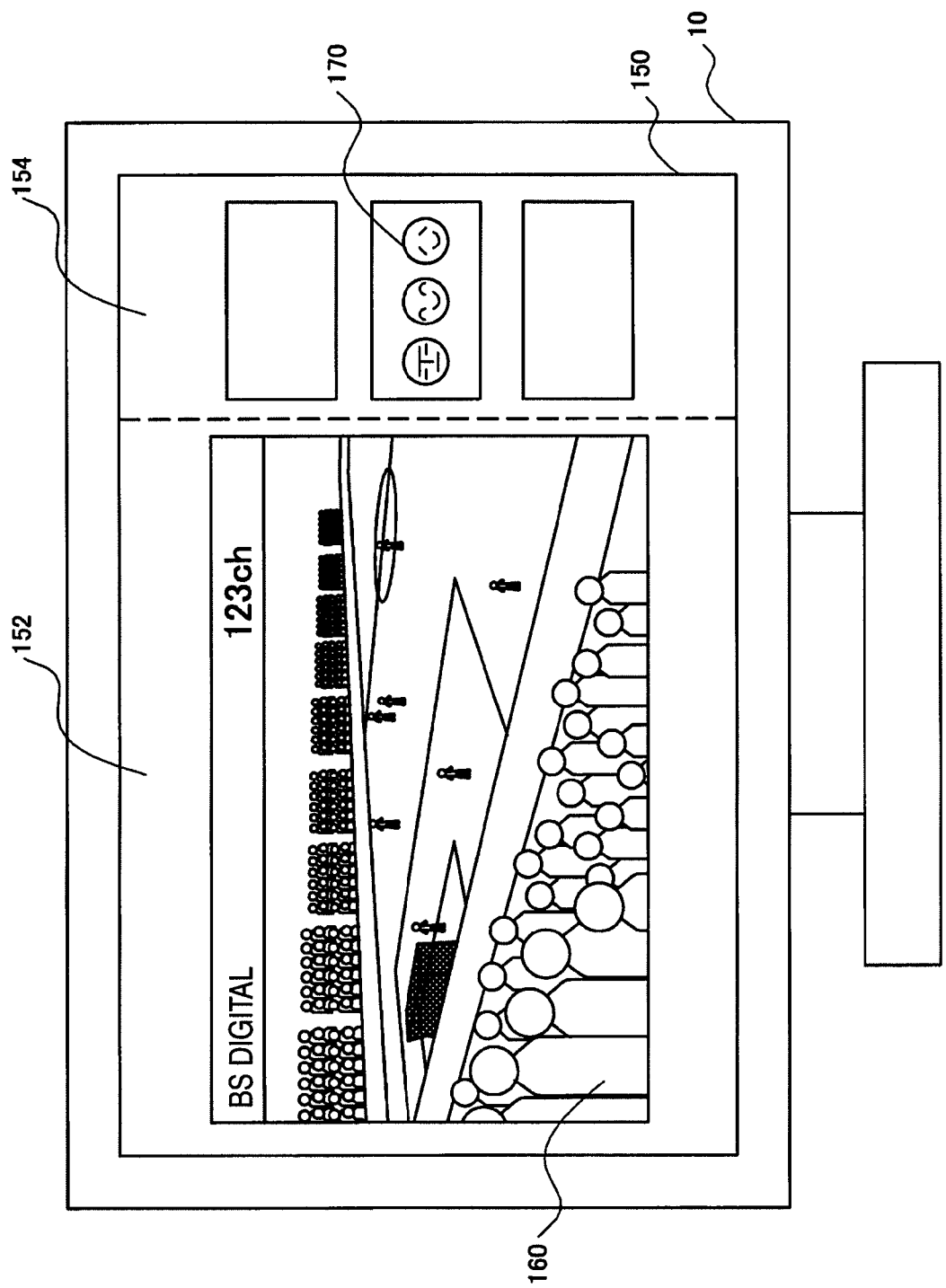
FIG. 22 is a diagram for explaining an example of a display screen of the content viewing apparatus according to the embodiment.

In the example shown in FIG. 22, a video 160 of a content presently reproduced (e.g., a program content being broadcasted) and three face icons (corresponding to the user information) representing the other three users who are viewing the content are displayed on the display screen 150 of the content viewing apparatus 10. Consequently, the user A of the content viewing apparatus 10 can understand that the three other users are viewing a content of a channel "BS digital 123ch" same as the content that the user A is viewing.

In the example shown in FIG. 22, a display area of the display screen 150 is divided into a content display area 152 for displaying a video of the content being reproduced and an application information display area 154. The application information display area 154 is an area for displaying various kinds of information (e.g., weather forecast, fortune telling, and news) provided by applications of the content viewing apparatus 10. The face icons 170 are displayed in the application information display area 154 and indicate information provided by a viewing information sharing application of the content viewing apparatus 10.

Figure 23:
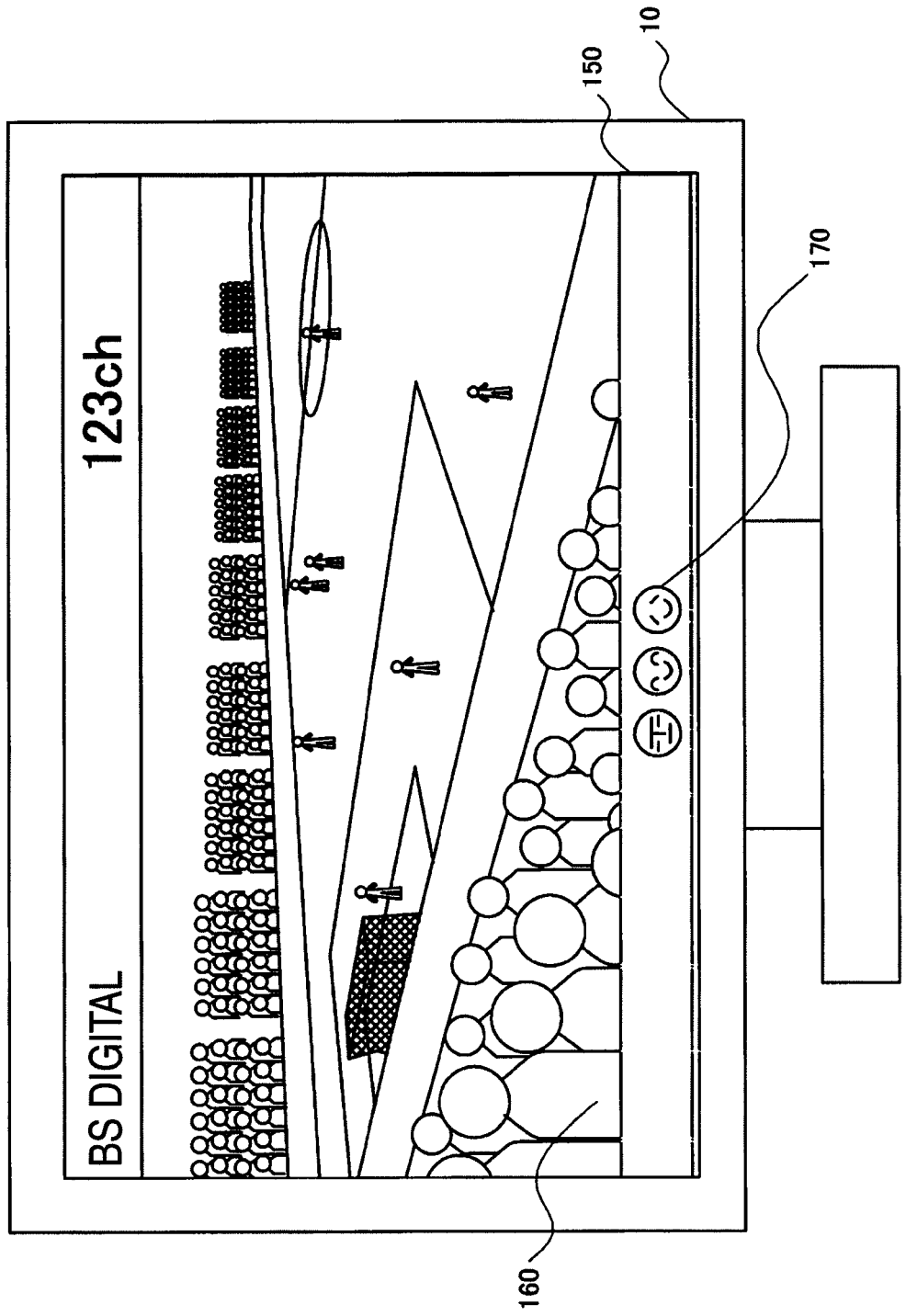
FIG. 23 is a diagram for explaining an example of a display screen of the content viewing apparatus according to the embodiment.

In the example shown in FIG. 23, in a lower part of the display screen 150 of the content viewing apparatus 10, three face icons 170 are displayed in a form superimposed on a video 162 of a content presently reproduced.

Figure 24:
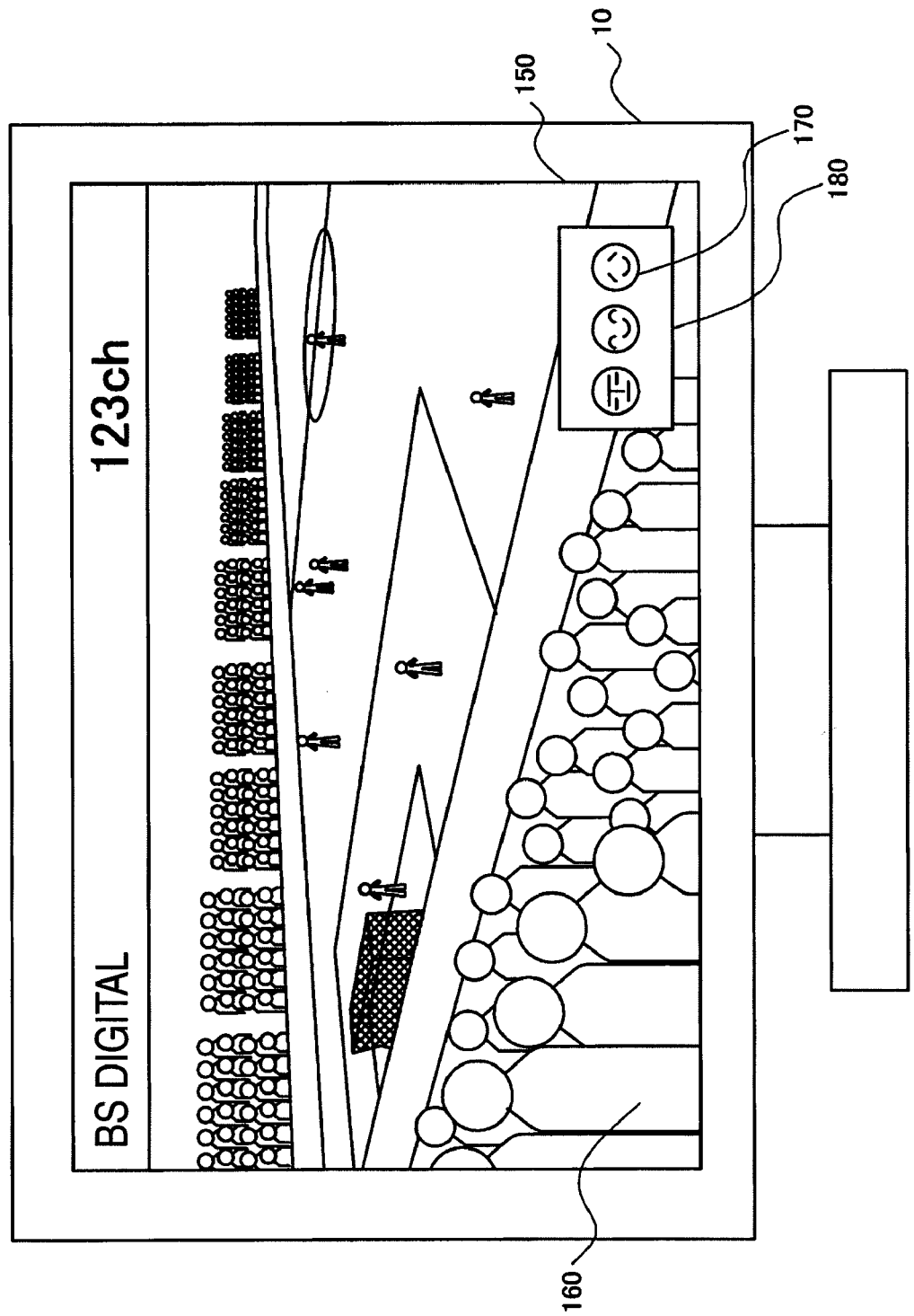
FIG. 24 is a diagram for explaining an example of a display screen of the content viewing apparatus according to the embodiment.

In the example shown in FIG. 24, in a lower right part of the display screen 150 of the content viewing apparatus 10, a relatively small square user information display area 180 is provided in a form superimposed on the video 162 of the content presently reproduced. The three face icons 170 are displayed in the user information display area 180.

Figure 25:
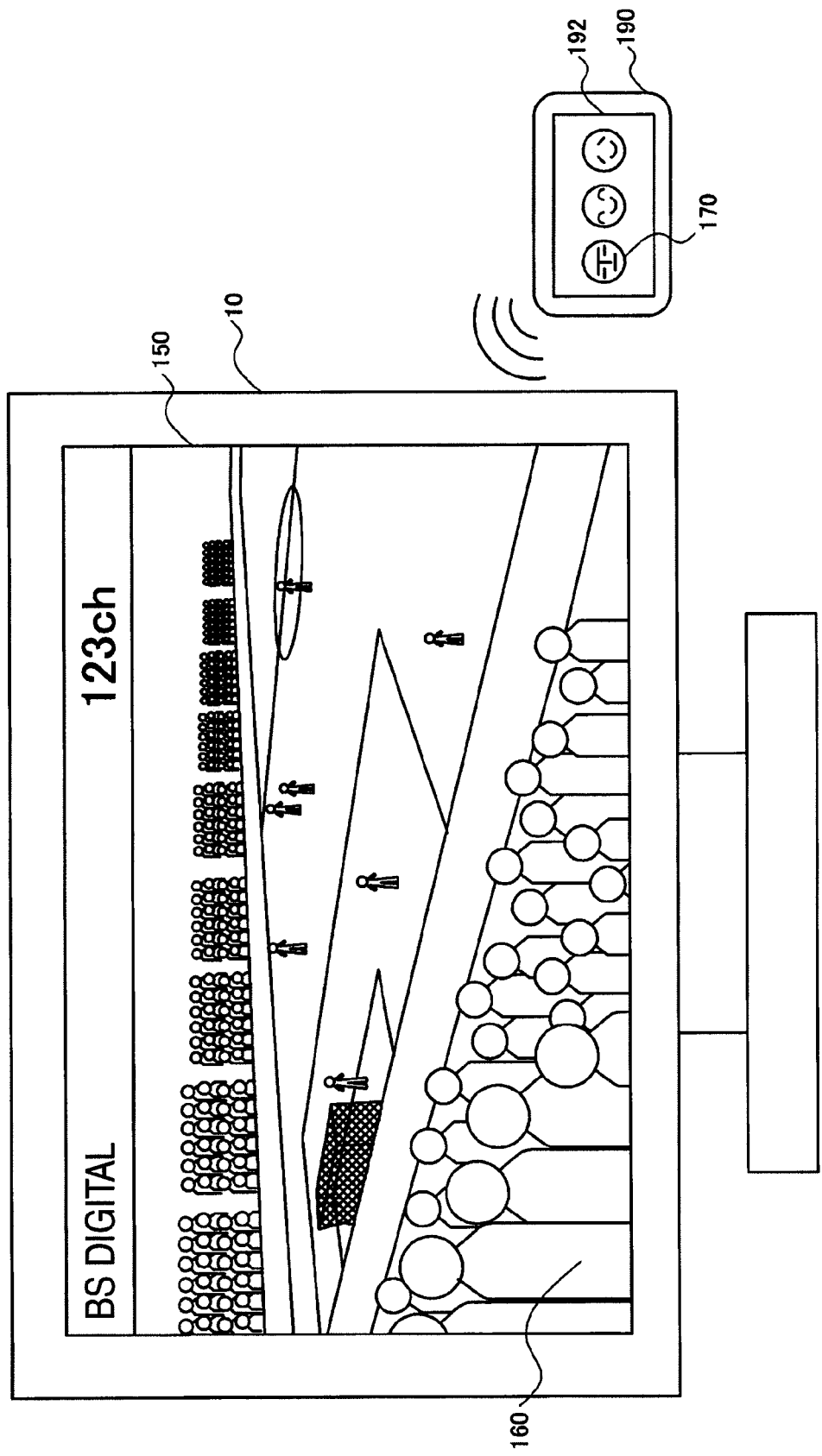
FIG. 25 is a diagram for explaining an example of a display screen of the content viewing apparatus according to the embodiment.

In the example shown in FIG. 25, the three face icons 170 representing the other users who are viewing the content being reproduced in the content viewing apparatus 10 are displayed on a display screen 192 of a portable apparatus 190 that can communicate with the content viewing apparatus 10 by radio. The portable apparatus 190 is, for example, a multi-function remote controller, a PDA, a cellular phone, a portable video and sound player, a portable game machine, or the like. In this case, user information of the other users can be transmitted from the content viewing apparatus 10 to the portable apparatus 190 and can be displayed in association with one another by the content viewing apparatus 10 and the portable apparatus 190.

Figure 26:
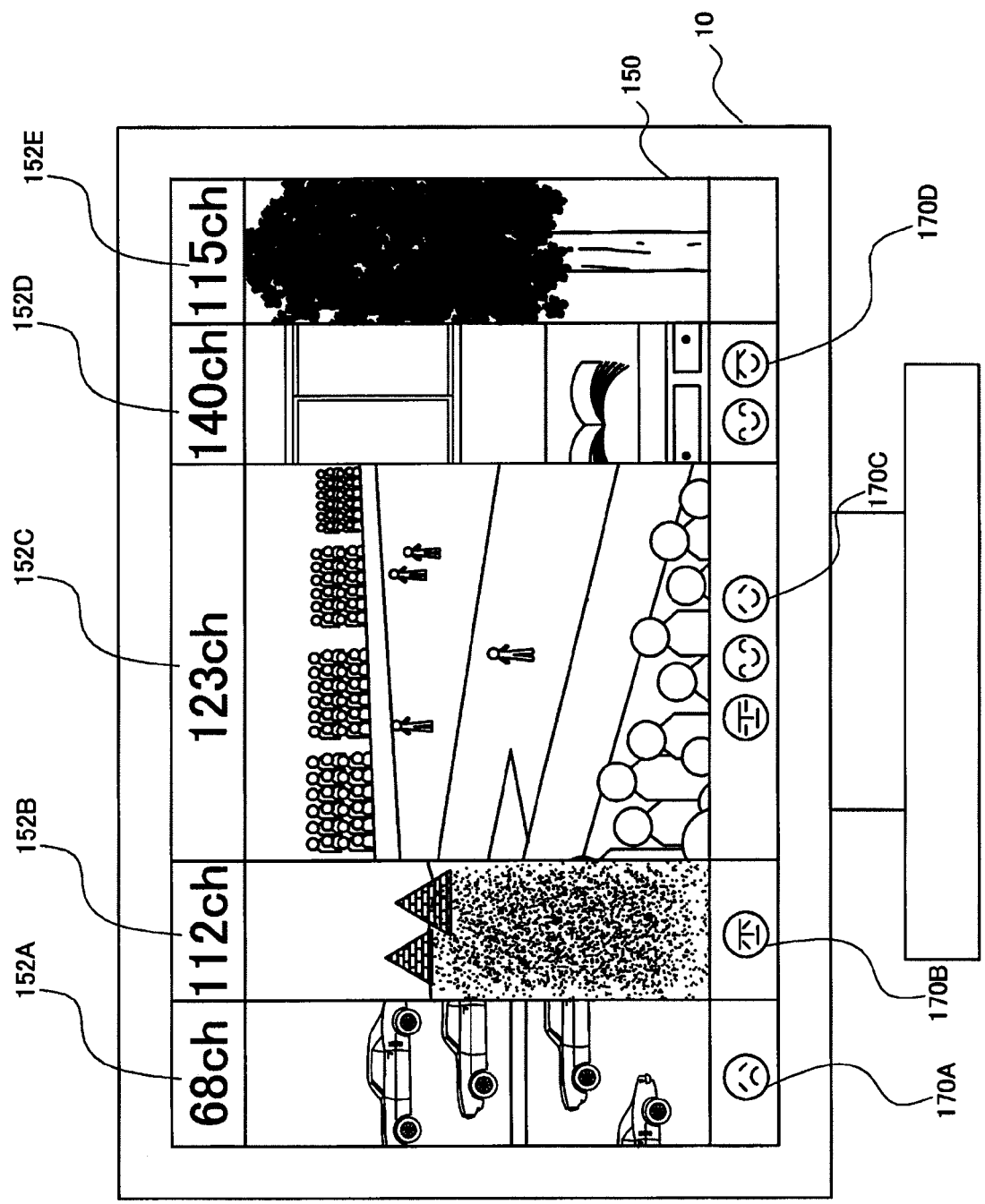
FIG. 26 is a diagram for explaining an example of a display screen of the content viewing apparatus according to the embodiment.

In the example shown in FIG. 26, a content display area of the display screen 150 of the content viewing apparatus 10 is divided into plural display areas 152A to 152E and contents being broadcasted in plural different broadcast channels are simultaneously displayed in parallel in the display areas 152A to 152E. At this point, face icons 170A to 170D of the other users who are viewing to the contents of the respective broadcast channels are displayed in positions corresponding to the respective display areas 152A to 152D as viewing information of the other users. For example, a content being broadcasted in "123ch" is displayed in the display area 152C. Face icons 170C of the three other users who are viewing this content are displayed in a lower part of the display area 152C. A content being broadcasted in "115ch" is displayed in the display area 152E. However, since no other user is viewing this content (or no other user discloses viewing information to the user A), the face icons 170 are not displayed in the display area 152E. With such a display format shown in FIG. 26, the user A of the content viewing apparatus 10 can easily and quickly grasp presence or absence of the other users who are viewing contents of plural different channels, the number of users, and the like.

An example of display of viewing information of the other users at the time when the user A sets and changes sharing level information in the content viewing apparatus 10 according to this embodiment is explained with reference to FIGS. 27 to 29.

In examples of display of viewing information shown in all FIGS. 27 to 29, the user A of the content viewing apparatus 10 sets the information acquisition level value to "5" to limit a range of users from whom viewing information is acquired and the user A sets the information acquisition level value to "12", to expand the range of users from whom viewing information is acquired. In all the figures, the video 160 of a content presently reproduced is displayed in the content display area 152 of the display screen 150. Viewing information of the other users who are viewing this content is displayed in the application information display area 154.

In the example shown in FIG. 27, the face icons 170 are displayed as viewing information of the other users. When the user A sets the information acquisition level value to "5", among the other users who are viewing a content identical with a content that the user A is viewing, the three face icons 170 of the three other users B, C, and D having high closeness with the user A are displayed on the display screen 150. This is useful to learn a viewing state of users having high closeness with the user A such as family members and close friends.

On the other hand, when the user A sets the information acquisition level value to "2", among the other users who are viewing a content identical with a content that the user A is viewing, the six face icons 170 of the six other users B, C, D, E, F, and G including users with high closeness and users with low closeness are displayed. This is useful for, for example, learning a general viewing tendency or the like by expanding a range of users from whom viewing information is acquired.

Since a level value of the information acquisition level information is set and changed in this way, according to preference of users, the user A can limit or expand the range of users from whom viewing information is acquired. By displaying the face icons 170, it is possible to plainly display the other users who are viewing the identical content.

In the example shown in FIG. 28, a time axis graph 172 is displayed as viewing information of the other users. The time axis graph 172 represents the number of other users who are viewing a content identical with a content that the user A is viewing. When the user A sets the information acquisition level value to "5", among the other three users B, C, and D having high closeness with the user A, the time axis graph 172 representing a change of the number of other users who are viewing a content identical with a content that the user A is viewing is displayed on the display screen 150.

On the other hand, when the user A sets the information acquisition level value to "2", among the six other users B, C, D, E, F, and G including users having high closeness and low closeness with the user A, the time axis graph 172 representing a change of the number of other users who are viewing a content identical with a content that the user A is viewing is displayed on the display screen 150.

Since the time axis graph 172 is displayed in this way, the user A can easily grasp the number of other users who are viewing the content being viewed, an increase or decrease of the number of other users on a time axis, and a viewing tendency. Besides the time axis graph, viewing information may be displayed as various graphs, tables, figures, and the like.

In the example shown in FIG. 29, comment information 174 of the other users is displayed, for example, in a bulletin board or chat format as viewing information of the other users. The comment information 174 is text information representing comments that the other users input when the other users view a content and is, for example, "interesting !!" and "sad because the hero has died" representing thoughts and ideas of users, feeling during viewing, and the like concerning a viewing content. Since the comment information 174 is displayed together with the content being viewed, the user A can grasp, on a real time basis, the thoughts and the ideas of the other users who are viewing the content and can communicate thoughts, ideas, and the like of the user A to the other users.

In an example in which the comment information 174 is displayed, when the user A sets the information acquisition level value to "5", comments of a small number of other users B, C, and D having high closeness with the user A are displayed on the display screen 150. This makes it possible to exclude comments of estranged users and look at only comments of friendly users. On the other hand, when the user A sets the information acquisition level value to "2", comments of a large number of other users including the other users having high closeness and low closeness with the user A are displayed on the display screen 150. Consequently, the user A can look at comments of a variety of users including friendly users and estranged users and use the comments as a reference for content viewings.

A method of the user A dynamically setting and changing sharing level information during content viewing in the content viewing apparatus 10 according to this embodiment is explained with reference to FIGS. 30 to 32.

In examples of display of viewing information shown in both FIGS. 30 and 31, the user A of the content viewing apparatus 10 sets the information acquisition level value to "5" to limit a range of users from whom viewing information is acquired and the user A sets the information acquisition level value to "2" to expand the range of users from whom viewing information is acquired. In both the figures, during viewing of a content by the content viewing apparatus 10, the video 160 of a content presently reproduced and the face icons 170 as viewing information of the other users are simultaneously displayed on the display screen 150.

FIGS. 30A and 30B are diagrams of examples in which the information acquisition level value is dynamically set and changed by using a remote controller 4 with a sliding lever 4*a*. The remote controller 4 with the sliding lever 4*a* (hereinafter simply referred to as "remote controller 4") has the sliding lever 4*a* as an operation key. The sliding lever 4*a* is, for example, a T-shaped lever. The user A can increase and decrease an input value concerning predetermined operation by moving the sliding lever 4*a* in forward and reverse directions. In an example explained here, a level value of information acquisition level information (an information acquisition level value) of the user A with respect to the other users is set and changed by using the sliding lever 4*a*.

In the remote controller 4, a higher information acquisition level values is inputted as the sliding lever 4*a* is further in a forward direction (a lower direction in the figure) and a lower information acquisition level value is inputted as the sliding lever 4*a* is further in a reverse direction (an upward direction in the figure). Therefore, the user A can set and change, from the content viewing apparatus 10 to the information management server 20, the information acquisition level value of the user A to a high (or low) level value by moving the sliding lever 4*a* of the remote controller 4 in the forward direction (or the reverse direction).

Therefore, as shown in FIG. 30A, the user A can set the information acquisition level value of the user A to the maximum value "5" by moving the sliding lever 4*a* in the forward direction to the maximum during content viewing. As a result, the three face icons 170 of the three other users B, C, and D who are viewing the content identical with the content that the user A is viewing are displayed on the display screen 150. When the sliding lever 4*a* is moved in the reverse direction from such a state, a set value of the information acquisition level value of the user A is gradually set and changed to smaller values from "5". According to the decrease in the set value of the information acquisition level value, since a range of users from whom information is acquired by the user A is expanded, the number of face icons 170 displayed on the display screen 150 increases. As a result, for example, as shown in FIG. 30B, when the information acquisition level value is set and changed to "2", the six face icons 170 of the six other users B, C, D, E, F, and G who are viewing the content identical with the content that the user A is viewing are displayed on the display screen 150.

In this way, the user A can dynamically set and change the information acquisition level value using the sliding lever 4*a* of the remote controller 4 during content viewing in the content viewing apparatus 10. In this setting and changing processing, the user A only has to move the sliding lever 4*a* up and down. Therefore, level setting operation is easy and the information acquisition level value can be easily and freely set and changed during content viewing.

An example in which the information acquisition level value is dynamically set and changed by using a remote controller 6 with a cross key 6*a* is explained with FIGS. 31A and 31B.

As shown in FIGS. 31A and 31B, in the remote controller 6 with the cross key 6*a* (hereinafter simply referred to as "remote controller 6"), a high information acquisition level value is inputted when the cross key 6*a* is pressed downward and a low information acquisition level value is inputted when the cross key 6*a* is pressed upward. Therefore, the user A of the content viewing apparatus 10 can set and change the information acquisition level value of the user A by moving the cross key 6*a* of the remote controller 6 upward and downward.

A sliding lever state display area 192 in which an image obtained by imaging a state of the above-described sliding lever 4*a* is displayed at a lower right corner of the display screen 150 of the content viewing apparatus 10. In the sliding lever state display area 192, a sliding lever image 192*a* imitating the sliding lever 4*a* is moved up and down according to user operation of the cross key 6*a* of the remote controller 6. For example, when the user presses the cross key 6*a* downward, the sliding lever image 192*a* of the sliding lever state display area 192 is also moved downward. When the sliding lever state display area 192 is provided, since a position of the sliding lever image 192*a* represents a set value of the information acquisition level, the user can easily grasp a present set value.

By using the remote controller 6 described above, as in the case of the remote controller 4, it is possible to dynamically set and change the information acquisition level value of the user A. Consequently, when the cross key 6*a* is pressed downward to set the information acquisition level value high, the number of face icons 170 displayed on the display screen 150 decreases (see FIG. 31A). On the other hand, when the cross key 6*a* is pressed upward to set the information acquisition level value low, the number of face icons 170 displayed on the display screen 150 increases (see FIG. 31B).

The methods of dynamically setting and changing the information acquisition level value of the user during content viewing using the sliding lever 4*a* and the cross key 6*a* of the remote controllers 4 and 6 are explained above with reference to FIGS. 31A and 30B and FIGS. 31A and 31B. When the information acquisition level value is dynamically set and changed as described above, the filtering unit 218 of the information management server 20 dynamically changes, according to the setting change of the information acquisition level value, the other users discriminated out of the other users belonging to the group identical with the group to which the user A of the content viewing apparatus 10 at the request source belongs. In other words, when the information acquisition level value is increased, the number of other users discriminated as information acquisition objects decreases. When the information acquisition level value is reduced, the number of other users discriminated as information acquisition objects increases. As a result, as shown in FIGS. 30A and 30B and FIGS. 31A and 31B, it is possible to dynamically change, during content viewing, viewing information of the other users displayed on the content viewing apparatus 10 of the user A.

The example in which only the information acquisition level is set and changed is explained above. However, the present invention is not limited to such an example. For example, the information acquisition level and the information disclosure level may be set and changed in association with each other by using an operation key such as the sliding lever 4*a* or the cross key 6*a*. Alternatively, the information acquisition level and the information disclosure level may be individually set and changed. The operation key used for the setting and changing of the level values is not limited to the sliding lever 4*a* and the cross key 6*a* and may be other arbitrary operation means such as a lever, a dial, a button, and a touch panel.

Setting modes for the information disclosure level information and the information acquisition level information according to this embodiment are explained with reference to FIG. 32. FIG. 32 is a diagram for explaining the setting modes for the information disclosure level information and the information acquisition level information according to this embodiment.

As explained above, when the setting and changing of the information disclosure level information and the information acquisition level information is performed, the content viewing apparatus 10 transmits a setting instruction including a setting instruction value to the information management server 20. The sharing-level setting unit 214 (see FIG. 4) of the information management server 20 changes, on the basis of the received setting instruction value, set values of the information disclosure level information and the information acquisition level information in the group DB 216.

When the setting instruction from the content viewing apparatus 10 includes two setting instruction values, i.e., a user designated value corresponding to the information disclosure level information and a user designated value (e.g., 1, 2, 3, 4, or 5) corresponding to the information acquisition level information, the sharing-level setting unit 214 only has to directly set the respective user designated values in the group DB 216.

However, when the setting instruction includes only one setting instruction value (e.g., 0 to 100) generated by using one operation key such as the sliding lever 4*a* or the cross key 6*a*, the sharing-level setting unit 214 generates, according to the one setting instruction value (e.g., 0 to 100), a level value (e.g., 1, 2, 3, 4, or 5) of the information disclosure level information and a level value (e.g., 1, 2, 3, 4, or 5) of the information acquisition level information and sets the generated level values in the group DB 216.

It is possible to provide plural setting modes by generating the level value of the information disclosure level information and the level value of the information acquisition level information to be different values on the basis of one setting instruction value. A specific example of the plural setting modes is explained below.

Figure 32:
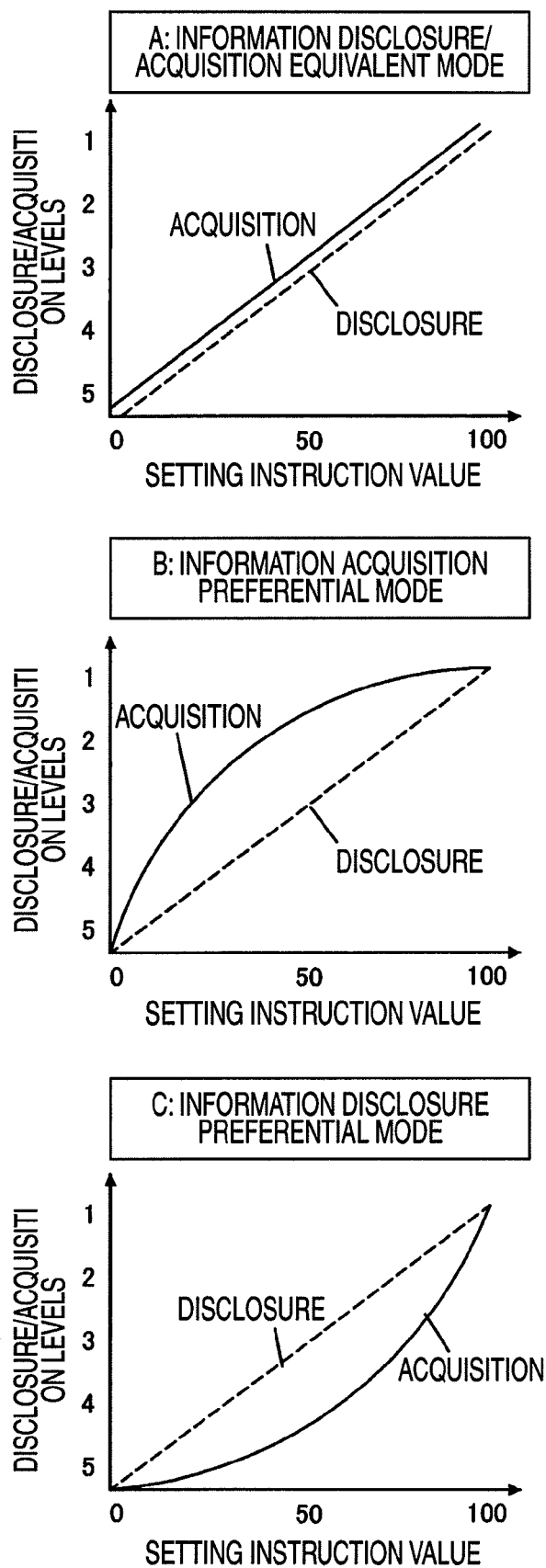
FIG. 32 is a diagram for explaining setting modes for the information disclosure level information and the information acquisition level information according to the embodiment.

As shown in FIG. 32, the sharing-level setting unit 214 (see FIG. 4) has an information disclosure and acquisition equivalent mode, an information acquisition preferential mode, and an information disclosure preferential mode as setting modes.

First, the information disclosure and acquisition equivalent mode is a mode for generating an information disclosure level value and an information acquisition level value identical with each other according to a setting instruction value (e.g., 0 to 100) of the operation key such as the sliding lever 4*a*. For example, when the setting instruction value is "0", both the information disclosure level value and the information acquisition level value are set to "5". When the setting instruction value is "50", both the information disclosure level value and the information acquisition level value are set to "3". When the information disclosure level value and the information acquisition level value are set to the identical value according to the setting instruction value of the operation key in this way, a range of other users from whom the user A acquires information and a range of other users to whom information of the user A is disclosed typically coincide with each other.

Second, the information acquisition preferential mode is a mode for setting the information acquisition level value to be typically equal to or lower than the information disclosure level value according to the setting instruction value (e.g., 0 to 100) of the operation key. For example, when the setting instruction value is "0", both the information disclosure level value and the information acquisition level value are set to "5". However, when the setting instruction value is "50", the information disclosure level value is set to "3" and the information acquisition level value is set to "2". When the information acquisition level value is set to be equal to or lower than the information disclosure level value in this way, a range of other users from whom the user A acquires information is wider than a range of other users to whom information of the user A is disclosed. Therefore, the user A can give higher priority to the acquisition of the viewing information of the other users than the disclosure of the viewing information of the user A.

Third, the information disclosure preferential mode is a mode for setting the information acquisition level value to be typically equal to or higher than the information disclosure level value according to the setting instruction value (e.g., 0 to 100) of the operation key. For example, when the setting instruction value is "0", both the information disclosure level value and the information acquisition level value are set to "5". However, when the setting instruction value is "50", the information disclosure level value is set to "3" and the information acquisition level value is set to "4". When the information acquisition level value is set to be equal to or higher than the information disclosure level value, a range of other users from whom the user A acquires information is narrower than a range of other users to whom information of the user A is disclosed. Therefore, the user A can give higher priority to the disclosure of the viewing information of the user A than the acquisition of the viewing information of the other users.

It is possible to diversify a method of sharing viewing information among users and improve convenience for the users by providing the plural setting modes in this way.

The information sharing system 1 according to this embodiment, the information sharing method employing the information sharing system 1, and the like are explained in detail above. According to this embodiment, viewing information of users in the plural content viewing apparatuses 10 are shared via the information management server 20 and, according to a viewing content of each of the users, viewing information of the other users is filtered and, then, provided to the user.

Consequently, when the user views a content such as a video, sound, a game, or the like, the user can display viewing information of the other users who are presently viewing the content (viewed the content in the past or plans to view the content in future) on the screen of the content viewing apparatus 10 in parallel to content information. For example, when the user views a program content of a television broadcast, the user can display viewing information of the other users who are viewing a program content of a tuned-in channel of the user on the screen of the content viewing apparatus 10 together with the program content that the user is viewing.

Therefore, the user can learn, for each of contents, which user is viewing the content. Therefore, the user can obtain a chance for viewing a content such as "I shall view a content if he is viewing it" or a chance for viewing a content together with the other users such as "I shall view a content if I can view it together with him". Consequently, amusement of content viewing is increased and a value of using the content viewing apparatus is increased.

In this embodiment, the sharing level information including the information disclosure level and the information acquisition level of each of the users are set in the information management server 20 and viewing information of the other users provided to the user is filtered. This makes it possible to execute privacy management corresponding to information disclosure level setting among the users. The user can arbitrarily adjust, according to information acquisition level setting, a range of users from whom the user acquires information. Therefore, it is possible to adjust an information acquisition range corresponding to preference of the user. Consequently, for example, it is possible to limit an acquisition range of viewing information to only a friendly user group such as family members or, conversely, expand the range to a large number of user groups in a not-so friendly relation such as acquaintances of acquaintances of the user.

Further, with the function of sharing the viewing information, the SNS service specialized for specific apparatuses such as a PC and a cellular phone in the past can be expanded to a new user class such as a non-PC class. A user of the PC and the cellar phone in the past can feel states and signs of other users such as family members and friends through the content viewing apparatus 10 (e.g., a television receiver) set in a living room or the like. Therefore, it is possible to provide convenience different from that in the use in apparatuses such as the PC and the cellular phone in which startup time and a display size are limited.

The embodiments of the present invention are explained above with reference to the accompanying drawings. However, it goes without saying that the present invention is not limited to such an example. It is evident that those skilled in the art can arrive at various modifications and alterations of the embodiment without departing from the spirit of the present invention. It is naturally understood that the modifications and alterations also belong to the technical scope of the present invention.

For example, in the embodiment, the example of the program content of the television broadcast is cited as the content to be viewed in the content viewing apparatus 10. However, the present invention is not limited to such an example. For example, the present invention can also be applied when the user of the content viewing apparatus 10 views other arbitrary contents such as a video content, a music content, a game, and an electronic book.

A program guide in the present invention is not limited to the example of the program guide including the EPG according to the embodiment. Arbitrary schedule information can be used as long as the schedule information is information in which a schedule of contents that can be viewed in common among the plural content viewing apparatuses 10. For example, the program guide includes a schedule table of delivery contents from the content delivery server 9, a program guide of a radio broadcast, and the like as well. The present invention can also be applied, for example, when viewing time of a shared content is adjusted among users in a group and a viewing schedule is shared by a program scheduler or the like in advance. In this way, the program guide is not limited to a public program guide distributed to the public from a broadcasting station or the like and may be a private schedule table in which a viewing plan of contents is arbitrarily set among the users.

In the embodiment, both the information disclosure level information and the information acquisition level information are set. However, only one of the information disclosure level information and the information acquisition level information may be set. Level values of the information disclosure level information and the information acquisition level information are not limited to be set in the five stages and can be set in an arbitrary number of stages.

In the embodiment, when a user is viewing a content presently broadcasted, information on other users who are viewing the content is displayed. However, the present invention is not limited to such an example. For example, when the user is viewing a content recorded in the past, information on other users who viewed the content (or record-scheduled the content) may be displayed. Consequently, the user can determine, referring to a viewing history of the other users, whether the user views the recorded content.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing apparatus for sharing associated information of content, the apparatus comprising:
   an output unit configured to output content; and
   a controller configured to control
      requesting to set a friendship level with a first user and a second user, uploading associated information of the content, and
requesting to set a privacy level that controls a sharing of
the associated information with the second user,
wherein a server judges whether the associated information shall be shared with the second user based on the friendship level and the privacy level, and
wherein a particular user for whom the friendship level is set higher than the privacy level is included in a user range of a content disclosure.

2. The information processing apparatus according to claim 1,
wherein the controller controls to request to register users of a plurality of information processing apparatuses into a group.

3. The information processing apparatus according to claim 2,
wherein the controller controls to request to set both or either of the friendship level and the privacy level of the group.

4. The information processing apparatus according to claim 2,
wherein the group can be set based on at least one of age, gender, interest, preference, living area, work relationship, and friend relationship of users.

5. The information processing apparatus according to claim 1,
wherein the friendship level and the privacy level are associated with the first user.

6. The information processing apparatus according to claim 1, wherein the privacy level represents a range of second users to whom a certain user permits disclosure of viewing information of the user.

7. The information processing apparatus according to claim 1,
wherein the content is at least one of television program, video, picture, news, music, e-book content, game, and software.

8. A method for sharing associated information of content, the method comprising:
requesting to set a friendship level with a first user and a second user to a server;
outputting content;
uploading associated information of the content to the server; and
requesting to set a privacy level that controls a sharing of the associated information with the second user,
wherein the server judges whether the associated information shall be shared with the second user based on the friendship level and the privacy level, and
wherein a particular user for whom the friendship level is set higher than the privacy level is included in a user range of a content disclosure.

9. The method according to claim 8, further comprising:
requesting to register users of a plurality of information processing apparatuses into a group.

10. The method according to claim 9, further comprising:
requesting to set both or either of the friendship level and the privacy level of the group.

11. The method according to claim 9, further comprising:
setting the group based on at least one of age, gender, interest, preference, living are, work relationship, and friend relationship of users.

12. The method according to claim 8, further comprising:
associating the friendship level and the privacy level with the first user.

13. The method according to claim 6, wherein the privacy level represents a range of second users to whom a certain user permits disclosure of viewing information of the user.

14. The method according to claim 8,
wherein the content is at least one of television program, video, picture, news, music, e-book content, game, and software.

15. A server for sharing associated information of content, the server comprising:
a communication unit configured to communicate with an information processing apparatus of a first user; and
a controller configured:
to set a friendship level with the first user and a second user,
to control the communication unit to receive associated information of content from the information processing apparatus,
to set a privacy level that controls a sharing of the associated information with the second user, and
to judge whether the associated information shall be shared with the second user based on the friendship level and the privacy level,
wherein a particular user for whom the friendship level is set higher than the privacy level is included in a user range of a content disclosure.

16. The server according to claim 15,
wherein the controller controls to request to register users of a plurality of information processing apparatuses into a group.

17. The server according to claim 16,
wherein the controller controls to request to set both or either of the friendship level and the privacy level of the group.

18. The server according to claim 16,
wherein the group can be set based on at least one of age, gender, interest, preference, living are, work relationship, and friend relationship of users.

19. The server according to claim 15,
wherein the friendship level and the privacy level are associated with the first user.

20. The server according to claim 15, wherein the privacy level represents a range of second users to whom a certain user permits disclosure of viewing information of the user.

21. The server according to claim 15,
wherein the content is at least one of television program, video, picture, news, music, e-book content, game, and software.

22. A non-transitory computer-readable recording medium for storing a computer program that when executed on a computer causes a process of sharing associated information of content, the program comprising the steps of:
requesting to set a friendship level with a first user and a second user to a server;
outputting content;
uploading associated information of the content to the server; and
requesting to set a privacy level that controls a sharing of the associated information with the second user,
wherein the server judges whether the associated information shall be shared with the second user based on the friendship level and the privacy level, and
wherein a particular user for whom the friendship level is set higher than the privacy level is included in a user range of a content disclosure.

23. The non-transitory computer-readable recording medium according to claim 22, wherein the program further comprises the step of:
requesting to register users of a plurality of information processing apparatuses into a group.

24. The non-transitory computer-readable recording medium according to claim 23, wherein the program further comprises the step of:
requesting to set both or either of the friendship level and the privacy level of the group.

25. The non-transitory computer-readable recording medium according to claim 23, wherein the program further comprises:
setting the group based on at least one of age, gender, interest, preference, living are, work relationship, and friend relationship of users.

26. The non-transitory computer-readable recording medium according to claim 22, wherein the program further comprises:
associating the friendship level and the privacy level with the first user.

27. The non-transitory computer-readable recording medium according to claim 22, wherein the privacy level represents a range of second users to whom a certain user permits disclosure of viewing information of the user.

28. The non-transitory computer-readable recording medium according to claim 22,
wherein the content is at least one of television program, video, picture, news, music, e-book content, game, and software.

29. A method for a server to share associated information of content, the method comprising:
setting a friendship level with a first user and a second user,
receiving associated information of content from an information processing apparatus of a first user,
setting a privacy level that controls a sharing of the associated information with the second user, and
judging whether the associated information shall be shared with the second user based on the friendship level and the privacy level, and
wherein a particular user for whom the friendship level is set higher than the privacy level is included in a user range of a content disclosure.

30. The method according to claim 29, further comprising:
requesting to register users of a plurality of information processing apparatuses into a group.

31. The method according to claim 30, further comprising:
requesting to set both or either of the friendship level and the privacy level of the group.

32. The method according to claim 30,
wherein the group can be set based on at least one of age, gender, interest, preference, living are, work relationship, and friend relationship of users.

33. The method according to claim 29,
wherein the friendship level and the privacy level are associated with the first user.

34. The method according to claim 29, wherein the privacy level represents a range of second users to whom a certain user permits disclosure of viewing information of the user.

35. The method according to claim 29,
wherein the content is at least one of television program, video, picture, news, music, e-book content, game, and software.

36. A non-transitory computer-readable recording medium for storing a computer program that when executed on a computer causes a process of a server for sharing associated information of content, the program comprising the steps of:
communicating with an information processing apparatus of a first user;
setting a friendship level with the first user and a second user,
controlling a communication unit to receive associated information of content from the information processing apparatus,
setting a privacy level that controls a sharing of the associated information with the second user, and
judging whether the associated information shall be shared with the second user based on the friendship level and the privacy level, and
wherein a particular user for whom the friendship level is set higher than the privacy level is included in a user range of a content disclosure.

37. The non-transitory computer-readable recording medium according to claim 36, wherein the program further comprises the step of
requesting to register users of a plurality of information processing apparatuses into a group.

38. The non-transitory computer-readable recording medium according to claim 37, wherein the program further comprises the step of:
requesting to set both or either of the friendship level and the privacy level of the group.

39. The non-transitory computer-readable recording medium according to claim 37, wherein the program further comprises:
setting the group based on at least one of age, gender, interest, preference, living are, work relationship, and friend relationship of users.

40. The non-transitory computer-readable recording medium according to claim 36, wherein the program further comprises,
associating the friendship level and the privacy level with the first user.

41. The non-transitory computer-readable recording medium according to claim 36, wherein the privacy level represents a range of second users to whom a certain user permits disclosure of viewing information of the user.

42. The non-transitory computer-readable recording medium according to claim 36,
wherein the content is at least one of television program, video, picture, news, music, e-book content, game, and software.

43. An information processing apparatus for sharing associated information of content, the apparatus comprising:
an output unit configured to output content;
a communication unit configured to:
send a request to set a friendship level with a first user and a second user,
send associated information of the content to a server, and
send a request to set a privacy level that controls a sharing of the associated information with the second user,
wherein the server judges whether the associated information shall be shared with the second user based on the friendship level and the privacy level, and
wherein a particular user for whom the friendship level is set higher than the privacy level is included in a user range of a content disclosure.

* * * * *